(12) United States Patent
Sekiguchi et al.

(10) Patent No.: US 11,504,674 B2
(45) Date of Patent: Nov. 22, 2022

(54) POLYOLEFIN MICROPOROUS FILM AND LITHIUM-ION SECONDARY CELL IN WHICH SAME IS USED

(71) Applicant: Asahi Kasei Kabushiki Kaisha, Tokyo (JP)

(72) Inventors: Manabu Sekiguchi, Tokyo (JP); Akihisa Yamashita, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 246 days.

(21) Appl. No.: 16/644,665

(22) PCT Filed: Oct. 12, 2018

(86) PCT No.: PCT/JP2018/038211
§ 371 (c)(1),
(2) Date: Mar. 5, 2020

(87) PCT Pub. No.: WO2019/074122
PCT Pub. Date: Apr. 18, 2019

(65) Prior Publication Data
US 2021/0106952 A1    Apr. 15, 2021

(30) Foreign Application Priority Data
Oct. 13, 2017 (JP) .............................. JP2017-199886

(51) Int. Cl.
*H01M 50/00* (2021.01)
*B01D 69/12* (2006.01)
(Continued)

(52) U.S. Cl.
CPC ............. *B01D 69/12* (2013.01); *B01D 71/26* (2013.01); *H01M 4/366* (2013.01);
(Continued)

(58) Field of Classification Search
CPC ........... H01M 50/449; H01M 10/0525; H01M 4/366; B32B 7/022; B32B 2307/736; B01D 2325/02
See application file for complete search history.

(56) References Cited

U.S. PATENT DOCUMENTS

2007/0037047 A1    2/2007 Ohashi et al.
2008/0193833 A1    8/2008 Ohashi et al.
(Continued)

FOREIGN PATENT DOCUMENTS

| CN | 105315533 A | 2/2016 |
|---|---|---|
| JP | 2002-289164 A | 10/2002 |

(Continued)

OTHER PUBLICATIONS

International Search Report issued in corresponding International Patent Application No. PCT/JP2018/038211 dated Jan. 8, 2019.
International Preliminary Report on Patentability and Written Opinion issued in corresponding International Patent Application No. PCT/JP2018/038211 dated Apr. 14, 2020.

*Primary Examiner* — Cynthia H Kelly
*Assistant Examiner* — Monique M Wills
(74) *Attorney, Agent, or Firm* — Morgan, Lewis & Bockius LLP

(57) ABSTRACT

A polyolefin microporous film having a laminated structure provided with at least one layer A containing a polyolefin and at least one layer B containing a polyolefin. 0 mass % to less than 3 mass % of polypropylene is contained in layer A and 1 mass % to less than 30 mass % of polypropylene is contained in layer B. When the proportion of polypropylene contained in layer A is represented by PPA (mass %) and the proportion of polypropylene contained in layer B is represented by PPB (mass %), PPB>PPA. In the polyolefin microporous film, the heat shrinkage ratio in TD at 120° C. measured upon applying, in MD, a constant load determined on the basis of the relationship: load (gf)=0.01×piercing
(Continued)

strength (gf) of polyolefin microporous film×length (mm) in TD of polyolefin microporous film, is 10 to 40% inclusive.

15 Claims, 2 Drawing Sheets

(51) Int. Cl.
*H01M 50/449* (2021.01)
*B01D 71/26* (2006.01)
*H01M 4/36* (2006.01)
*H01M 10/0525* (2010.01)
*H01M 4/02* (2006.01)

(52) U.S. Cl.
CPC ..... *H01M 10/0525* (2013.01); *H01M 50/449* (2021.01); *B01D 2325/02* (2013.01); *B01D 2325/04* (2013.01); *B01D 2325/24* (2013.01); *B01D 2325/34* (2013.01); *H01M 2004/027* (2013.01); *H01M 2004/028* (2013.01)

(56) References Cited

U.S. PATENT DOCUMENTS

| | | | |
|---|---|---|---|
| 2011/0268942 A1* | 11/2011 | Rhee | B32B 27/08 |
| | | | 428/220 |
| 2016/0030974 A1 | 2/2016 | Kang et al. | |
| 2017/0125766 A1 | 5/2017 | Harumoto et al. | |
| 2017/0149038 A1 | 5/2017 | Miura et al. | |

FOREIGN PATENT DOCUMENTS

| | | | |
|---|---|---|---|
| JP | 2002-321323 A | 11/2002 | |
| JP | 2009-266808 A | 11/2009 | |
| JP | 2011-063025 A | 3/2011 | |
| JP | 2013-126765 A | 6/2013 | |
| JP | 2013-224033 A | 10/2013 | |
| WO | 2004/089627 A1 | 10/2004 | |
| WO | 2006/038532 A1 | 4/2006 | |
| WO | 2009/048175 A2 | 4/2009 | |
| WO | 2015/182689 A1 | 12/2015 | |
| WO | 2015/194667 A1 | 12/2015 | |

\* cited by examiner (A)

(B)

(C)

POLYOLEFIN MICROPOROUS FILM AND LITHIUM-ION SECONDARY CELL IN WHICH SAME IS USED

FIELD

The present invention relates to a polyolefin microporous membrane and a lithium ion secondary battery using the same.

BACKGROUND

Polyolefin microporous membranes have been used as separators for batteries, separators for capacitors, materials for fuel cells, microfiltration membranes, etc., and in particular, as separators for lithium ion secondary batteries. Separators prevent direct contact between positive electrodes and negative electrodes and also permeate ions through electrolytic solutions held in their microporous membrane.

In recent years, lithium ion secondary batteries have been used for applications of miniature electronic devices, such as cellular phones and laptop computers, etc., and also applied to electric vehicles including electric cars and small electric motorcycles, etc. Since in-vehicle lithium ion secondary batteries tend to have a larger capacity per unit cell, the amount of heat generated upon abnormal heat generation of the batteries also increases. Therefore, improvement in safety has become a more important issue due to the growing demand for the lithium ion secondary batteries for in-vehicle applications. On the other hand, from the viewpoints of increasing a capacity and energy density, saving a weight and thinning lithium ion secondary batteries, the mainstream of external materials for lithium ion secondary batteries has shifted from metal cans to laminated films.

Laminate type batteries have a more flexible external body than square batteries and cylindrical batteries, and there are concerns about battery swelling and distortion due to gas generation. In order to prevent them, batteries are assembled by using separators having an adhesive layer on the surface thereof, and then an adhesion treatment is carried out, in which the separators and electrodes are adhered with each other by pressing (also referred to as "hot pressing" in the present description) the battery while heating it.

As a base material of such separators of lithium ion secondary batteries, various raw materials or materials for polyolefin microporous membranes have been investigated (PTLs 1 to 7).

PTL 1 describes a polyolefin multilayer microporous membrane having at least 3 layers comprising first microporous layers (surface layers) consisting of a polyethylene-based resin containing ultrahigh molecular weight polyethylene, and a second microporous layer (intermediate layer) consisting of a polyolefin resin containing high density polyethylene and polypropylene, wherein the polyolefin multilayer microporous membrane has a puncture strength of 25 g/μm or more, a static coefficient of friction for an aluminum foil of 0.40 or more, and a meltdown temperature of 180° C. or higher.

PTL 2 describes a multilayer microporous membrane having at least a first microporous membrane layer containing a first polyethylene, a first polypropylene, and a second polypropylene different from the first polypropylene, and a second microporous membrane layer containing the first polyethylene and the second polyethylene, wherein the multilayer microporous membrane has a puncture strength of 3,500 mN or more and air permeability of 1,000 seconds/$cm^3$ or shorter after thermal compression.

PTLs 3 and 4 describe a polyolefin microporous membrane in which a microporous membrane A and a polyethylene microporous membrane B are laminated and integrated with each other, wherein the microporous membrane A comprises polyethylene and polypropylene as essential components, wherein the microporous membrane A comprises 3 to 50% by weight of the polypropylene, and the polyolefin microporous membrane has a membrane thickness is 5 to 20 μm.

PTL 5 describes a polyolefin microporous membrane comprising a first microporous layer containing polypropylene and polyethylene and a second microporous layer laminated on the first microporous layer, wherein the first microporous membrane constitutes a surface layer, and the polypropylene has a heat of fusion of 90 J/g or more.

PTL 6 describes a polyolefin microporous membrane comprising polyethylene and polypropylene as essential components and consisting of a laminated film of three layers, wherein the polyolefin microporous membrane has an average pore size of 0.02 μm or more and 1 μm or less, at least one surface layer comprises more than 50% by weight and 95% by weight or less of the polypropylene, and the entire membrane comprises 60% by weight and 95% by weight or less of polyethylene.

PTL 7 describes a polyolefin microporous membrane comprising a laminated film of two or more layers, wherein at least one surface layer has a thickness of 0.2 μm or more and 4 μm or less and contains 5% by weight or more and 60% by weight or less of inorganic particles, and at least other layer contains 50% by weight or more of polyethylene, wherein the polyolefin microporous membrane has an air permeability of 50 seconds/100 cc or longer and 1000 seconds/100 cc or shorter, and a puncture strength of 3.0 N/20 μm or more.

CITATION LIST

Patent Literature

[PTL 1] WO2015/182689
[PTL 2] Japanese Unexamined Patent Publication No. 2013-224033
[PTL 3] Japanese Unexamined Patent Publication No. 2013-126765
[PTL 4] Japanese Unexamined Patent Publication No. 2011-63025
[PTL 5] Japanese Unexamined Patent Publication No. 2009-266808
[PTL 6] WO2004/089627
[PTL 7] WO2006/038532

SUMMARY

Technical Problem

Separators using conventional polyolefin microporous membranes described in PTLs 1 to 7 often generate a winding displacement, distortion and deflection in a battery due to shrinkage of the separator when hot pressed. For example, in a laminate type battery comprising a wound body in which a laminate of electrodes and separators is wound in a flat form in MD, there has been an issue of an increased defect ratio of the battery, due to displacement between the edges of the electrodes and the separators upon hot pressing, or distortion generated by wrinkles. Moreover, it has been found that the permeability and cycling characteristics of the battery after hot pressing may be reduced. Further, in one embodiment, separators which exhibits a favorable short-circuit resistance in a short-circuit test under severe conditions are required in the field of in-vehicle batteries, etc., where separators are required to have a higher level of safety.

Therefore, one of the objects of the present invention is to provide a polyolefin microporous membrane that can prevent separator-derived battery distortion and reduction of permeability and cycle characteristics upon hot pressing. Moreover, in one embodiment, another object is to provide a polyolefin microporous membrane having a favorable short-circuit resistance in a short-circuit test under severe conditions.

Solution to Problem

The inventors have found that the problems can be solved by the laminated structure, the proportion of polypropylene in each layer, the specific ranges of thermal shrinkage in TD under a load applied in MD, etc., and thus have completed the present invention. The present invention is as follows:

[1]
A polyolefin microporous membrane having a laminated structure comprising at least one layer of an A layer containing polyolefin and at least one layer of a B layer containing polyolefin, wherein the A layer contains 0% by weight or more and less than 3% by weight of polypropylene, the B layer contains 1% by weight or more and less than 30% by weight of polypropylene, and when a proportion of the polypropylene contained in the A layer is represented by PPA (% by weight) and a proportion of the polypropylene in the B layer is represented by PPB (% by weight), PPB is greater than PPA, and wherein the polyolefin microporous membrane has a thermal shrinkage in TD at 120° C. of 10% or more and 40% or less, measured under a constant load applied in MD which is determined based on the following equation:

Load $(gf)$=0.01×Puncture strength $(gf)$ of the polyolefin microporous membrane×Length $(mm)$ in TD of the polyolefin microporous membrane.

[2]
The polyolefin microporous membrane according to [1], having a laminated structure comprising at least one layer of the A layer containing polyolefin and at least one layer of the B layer containing polyolefin on both surfaces of the A layer, wherein a proportion of a thickness of the A layer to a total thickness of the polyolefin microporous membrane is 40% or more and 90% or less.

[3]
The polyolefin microporous membrane according to [1] or [2], wherein the B layer contains less than 5% by weight of inorganic particles.

[4]
The microporous membrane according to any one of [1] to [3], wherein the polyolefin microporous membrane contains 10% by weight or less of molecules having a molecular weight of 3,000,000 or more, and 3.0% by weight or less of molecules having a molecular weight of 30,000 or less, in an integration curve obtained from gel permeation chromatography measurement of the polyolefin microporous membrane.

[5]
The polyolefin microporous membrane according to any one of [1] to [4], wherein the polyolefin microporous membrane has a melt index under a load of 21.6 kgf at 190° C. is 0.1 g/10 minutes or more and 3.0 g/10 minutes or less.

[6]
The polyolefin microporous membrane according to any one of [1] to [5], wherein the A layer of the polyolefin microporous membrane has a melt index under a load of 21.6 kgf at 190° C. is 0.01 g/10 minutes or more and 0.3 g/10 minutes or less.

[7]
The polyolefin microporous membrane according to any one of [1] to [6], wherein the B layer of the polyolefin microporous membrane has a melt index under a load of 21.6 kgf at 190° C. is greater than 0.3 g/10 minutes and 2.0 g/10 minutes or less.

[8]
The polyolefin microporous membrane according to any one of [1] to [7], wherein a ratio of a melt index of the B layer to a melt index of the A layer (melt index of B layer/melt index of A layer) is 1.5 or more and 20 or less.

[9]
The polyolefin microporous membrane according to any one of [1] to [8], wherein a shutdown response time is 12 seconds or longer and 22 seconds or shorter.

[10]
The polyolefin microporous membrane according to any one of [1] to [9], wherein a shutdown temperature is 150° C. or lower and a membrane rupture temperature is higher than 170° C.

[11]
The polyolefin microporous membrane according to any one of [1] to [10], wherein the polypropylene contained in the polyolefin microporous membrane has a viscosity-average molecular weight of 300,000 or more and 1,200,000 or less.

[12]
The polyolefin microporous membrane according to any one of [1] to [11], wherein the polypropylene contained in the polyolefin microporous membrane is a homopolymer.

[13]
The polyolefin microporous membrane according to any one of [1] to [12], wherein a puncture strength is 170 gf/10 μm or more.

[14]
A laminate type lithium ion secondary battery, comprising an external body consisting of a laminated film, and at least one structure in which a positive electrode and a negative electrode are laminated via the polyolefin microporous membrane according to any one of [1] to [13] in the external body.

Advantageous of Effects of Invention

The present invention can provide a polyolefin microporous membrane that can provide a separator capable of preventing distortion of a battery and reduction of battery characteristics upon hot pressing while maintaining safety. In one embodiment, the present invention can provide a polyolefin microporous membrane that can provide a separator having a favorable short-circuit resistance in a short-circuit test under severe conditions, such as a nail puncture test, etc. The above descriptions should not be regarded as disclosing all embodiments of the present invention and all advantages in relation to the present invention.

DESCRIPTION OF EMBODIMENTS

Figure 1:
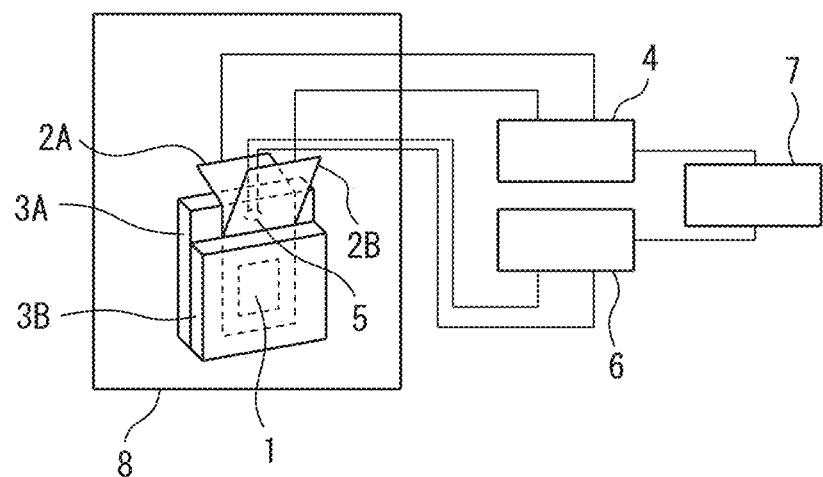
FIG. 1(A) is a schematic diagram illustrating a measurement apparatus of a shutdown temperature.
FIG. 1(B) is a schematic view explaining a microporous membrane fixed on a nickel foil in measurement of a shutdown temperature.
FIG. 1(C) is a schematic view explaining masking of a nickel foil in measurement of a shutdown temperature.
Figure 1:
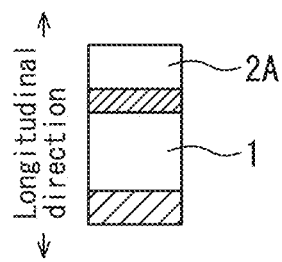
Figure 1:
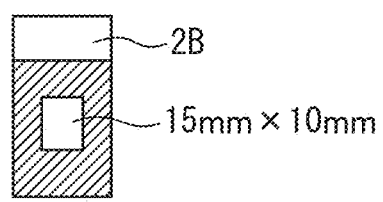

Embodiments for carrying out the invention (hereunder often referred to as "the present embodiment") will now be explained in detail below and it is to be understood, however, that the present invention is not limited to the following embodiments. In the present description, the upper limits and lower limits of the ranges of various numerals can be arbitrarily combined with each other.

<<Polyolefin Microporous Film>>
<Laminated Structure>

The polyolefin microporous membrane of the present embodiment has a laminated structure of two or more layers having at least one layer of an A layer containing polyolefin and at least one layer of a B layer containing polyolefin. The polyolefin microporous membrane preferably has a laminated structure of three or more layers having at least one B layer(s) each on both sides (both surfaces) of the A layer. The laminated structure is not limited to a two-layer structure of "A layer-B layer" or a three-layer structure of "B layer-A layer-B layer" provided that the laminated structure has one layer each of the A layer and the B layer. The polyolefin microporous membrane may include, for example, one or more additional layers formed on either one or both of the B layers or between the A layer and the B layer. The additional layer include, for example: a layer containing polyolefin; a heat resistant layer containing inorganic particles and a heat resistant resin, such as a crosslinkable polymer, etc.; and an adhesive layer containing an adhesive polymer, etc.

The A layer and the B layer contain polyolefin and are preferably consisting of polyolefin. The polyolefin in the A layer and the B layer may be in the form of a polyolefin microporous material, for example, a polyolefin-based fiber woven fabric (woven cloth), a polyolefin-based fiber nonwoven fabric, etc. The polyolefin include, for example, homopolymers, copolymers, or multistage polymers, etc., obtained by using monomers, such as ethylene, propylene, 1-butene, 4-methyl-1-pentene, 1-hexene, 1-octene, etc. These polymers may be used alone or in combination of two or more. The polyolefin is preferably at least one selected from the group consisting of polyethylene, polypropylene, and copolymers thereof from the viewpoint of shutdown and meltdown characteristics of the separator.

Specific examples of polyethylene include low density polyethylene (LDPE), linear low density polyethylene (LLDPE), medium density polyethylene (MDPE), high density polyethylene (HDPE), high molecular weight polyethylene (HMWPE), ultrahigh molecular weight polyethylene (UHMWPE), etc.

In the present description, the high molecular weight polyethylene (HMWPE) refers to a polyethylene having a viscosity-average molecular weight (Mv) of 100,000 or more. Mv can be calculated by measuring the intrinsic viscosity [η] (dl/g) at 135° C. in a decalin solvent based on ASTM-D4020, and according to the following equation:

$$[\eta]=6.77\times10^{-4} Mv^{0.67}$$

In general, ultrahigh molecular weight polyethylene (UHMWPE) has a Mv of 1,000,000 or more, and the definition of the high molecular weight polyethylene (HMWPE) in the present description includes UHMWPE.

In the present description, the high density polyethylene refers to a polyethylene having a density of 0.942 to 0.970 g/cm$^3$. In the present invention, the density of polyethylene refers to a value measured according to D) density gradient tube method described in JIS K7112 (1999).

Specific examples of polypropylene include isotactic polypropylene, syndiotactic polypropylene, atactic polypropylene, etc.

Specific examples of a copolymer of ethylene and propylene include an ethylene-propylene random copolymer, ethylene propylene rubber, etc.

(A Layer)

The A layer contains a polypropylene, based on the total weight of the resin components constituting the A layer, in an amount of preferably 0% by weight or more and less than 3% by weight, more preferably 0% by weight or more and less than 1% by weight, and most preferably the layer A does not contain a polypropylene. When the A layer contains less than 3% by weight of a polypropylene, the mechanical strength and elongation of the polyolefin microporous membrane become more preferable.

When the polyolefin contained in the A layer contains a polyethylene, the amount of polyethylene based on the total weight of the resin components constituting the A layer, is preferably 90% by weight or more and 100% by weight or less, more preferably 97% by weight or more and 100% by weight or less, and most preferably the A layer is consisting of polyethylene. When the A layer contains polyethylene in a high proportion, the shutdown function of the polyolefin microporous membrane becomes more preferable.

The proportion of a thickness of the A layer to the entire thickness (total thickness) of the polyolefin microporous membrane is 40% or more and 90% or less, preferably 50% or more and 90% or less, more preferably 55% or more and 85% or less, and even more preferably 60% or more and 80% or less. When the proportion of the thickness of the A layer is 90% or less, the melting point of the polyolefin microporous membrane as a whole does not become too low, which can prevent thermal shrinkage of the separator, and moreover, prevent reduction of permeability of the A layer due to clogging up the pores thereof upon hot pressing. Further, since the A layer has a lower polypropylene content than the B layer, it is likely to have a higher toughness and a lower melting point than the B layer. Therefore, when the proportion of the thickness of the A layer is 50% or more, the A layer serves as a base material for the polyolefin microporous membrane, which can lead to a preferable mechanical strength and elongation of the polyolefin microporous membrane and the shutdown function.

(B Layer)

The B layer contains more polypropylene than the A layer, i.e., when a proportion of polypropylene contained in the A layer is represented by PPA (% by weight) and a proportion of polypropylene contained in the B layer is represented by PPB (% by weight), then PPB is greater than PPA. The lower limit of the amount of polypropylene contained in the B layer is preferably 1% by weight or more, more preferably 3% by weight or more, still more preferably 4% by weight or more, even still more preferably 5% by weight or more, and most preferably 10% by weight or more, based on the total weight of resin components constituting the B layer. The upper limit of the amount of polypropylene contained in the B layer is preferably 30% by weight or less, more preferably 27% by weight or less, still more preferably 25% by weight or less, even still more preferably 20% by weight or less, and most preferably 18% by weight or less, based on the total weight of resin components constituting the B layer. The layer B contains polypropylene in a range of, for example, 1% by weight or more and 30% by weight or less, or 1% by weight or more and less than 30% by weight, and preferably 5% by weight or more and less than 30% by weight, more preferably 5% by weight and 25% by weight or less, and still more preferably 10% by weight or more and 20% by weight or less. Owing to the fact that the A layer secures strength and elongation and the B layer contains the polypropylene within the above range, the distortion can be prevented since the thermal shrinkage in TD can be prevented when the polyolefin microporous membrane is hot pressed under a certain tension applied in MD. Moreover, since polypropylene has a higher melting point than polyethylene, the B layer containing a polypropylene within the above range can prevent reduction of permeability of the separator due to melting of the surface layer upon hot pressing to, while maintaining a shutdown function of the separator.

When the polyolefin contained in the B layer contains polyethylene, the amount of polyethylene based on the total weight of resin components constituting the B layer, is preferably 60% by weight or more and 99% by weight or less, more preferably 70% by weight or more and 95% by weight or less, still more preferably 75% by weight or more and 90% by weight or less, and most preferably the B layer is consisting of polypropylene and polyethylene.

The polyethylene contained in the A layer and the B layer has a viscosity-average molecular weight of preferably 50,000 or more and 10,000,000 or less, more preferably 100,000 or more and 5,000,000 or less, further preferably 120,000 or more and 3,000,000 or less, and most preferably 150,000 or more and 1,000,000 or less. When the molecular weight is 50,000 or more, a polyolefin microporous membrane having sufficient strength can be obtained, and when the molecular weight is 10,000,000 or less, the internal stress upon stretching does not become excessively large, thereby excessive heat shrinkage can be prevented. Further, the polyethylene has a molecular weight distribution (Mw/Mn) of preferably 20 or less, more preferably 17 or less, still more preferably 14 or less, even still more preferably 10 or less, and most preferably 8 or less, and preferably 2 or more, more preferably 3 or more, and still more preferably 4 or more. The molecular weight distribution of 20 or less can prevent reduction of tensile strength at break due to a low molecular weight component, and also prevent an increase in residual stress due to a high molecular weight component. The molecular weight distribution of 2 or more can prevent an increase in residual stress.

When the polyolefin microporous membrane contains ultrahigh molecular weight polyethylene (UHMWPE), the A layer preferably contains UHMWPE. When the A layer contains UHMWPE, the amount of UHMWPE based on the total weight of the polyolefin in the A layer, is preferably 5% by weight or more, more preferably 10% by weight or more, and preferably 70% by weight or less, and more preferably 60% by weight or less. When the A layer contains UHMWPE, the tensile elongation at break as a base material of the polyolefin microporous membrane having a laminated structure, can be improved. The B layer may include UHMPWE. When the B layer contains UHMPWE, the amount of UHMWPE is preferably less than 30% by weight, more preferably less than 20% by weight, and even more preferably less than 10% by weight, based on the total weight of the polyolefin in the B layer. When the B layer contains UHMWPE, by setting the amount of UHMWPE in the B layer to 30% by weight or less, the melt viscosity does not increase too much when a temperature rises, and the shutdown response time does not become too late. This effect becomes remarkable when the polyolefin microporous membrane includes a structure of B layer-A layer-B layer in which the heat is transmitted first to the B layer. The proportion of UHMWPE to the total weight of polyolefin in the entire polyolefin microporous membrane is preferably less than 45% by weight, more preferably less than 35% by weight, and even more preferably less than 25% by weight. When the ratio of UHMWPE to the total weight of polyolefin in the entire polyolefin microporous membrane is less than 45%, an increase in thermal shrinkage due to residual stress can be prevented.

When the polyolefin microporous membrane contains low density polyethylene (LDPE) as polyolefin, the B layer preferably contains LDPE. When the B layer contains LDPE, the amount of LDPE is preferably 3% by weight or more and more preferably 5% by weight or more, based on the total weight of the polyolefin in the B layer. When the B layer contains LDPE, the shutdown temperature and the shutdown response time can be lowered. This effect becomes remarkable when the polyolefin microporous membrane includes a structure of B layer-A layer-B layer in which the heat is transmitted first to the B layer. The A layer may contain LDPE. When the A layer contains LDPE, the amount of LDPE is preferably 25% by weight or less, more preferably 20% by weight or less, still more preferably 15% by weight or less, and even still more preferably 10% by weight or less, based on the total weight of the polyolefin in the A layer. When the A layer contains LDPE, a decrease in the tensile elongation at break and mechanical strength can be prevented by adjusting the proportion of LDPE to 25% by weight or less. This effect becomes remarkable when the polyolefin microporous membrane includes a structure of B layer-A layer-B layer in which the A layer secures the mechanical strength as a base material. A proportion of LDPE to the total weight of polyolefin in the entire polyolefin microporous membrane is preferably 25% by weight or less, more preferably 18% by weight or less, and still more preferably 13% by weight or less. The proportion of LDPE to the total weight of polyolefin in the entire polyolefin microporous membrane being 25% by weight or less, is capable of preventing an excessive decrease in crystallinity and preventing an increase in the thermal shrinkage, which is caused by shrinkage of the amorphous portion below the melting point due to residual stress, as well as a problem, such as a decrease in permeability and cycle characteristics. This effect is remarkable when the separator having an adhesive layer is used as a separator for laminate type secondary batteries that require a step of fusing the separator with electrodes by hot pressing.

The lower limit of viscosity-average molecular weights of polypropylenes contained in the A layer and the B layer is preferably 50,000 or more, more preferably 100,000 or more, still more preferably 150,000 or more, even still more preferably 300,000 or more, and most preferably 350,000 or more. The upper limit of the viscosity-average molecular weights of the polypropylenes contained in the A layer and the B layer is preferably 10,000,000 or less, more preferably 5,000,000 or less, still more preferably 1,000,000 or less, and most preferably 800,000 or less. The range of the viscosity-average molecular weights of the polypropylenes contained in the A layer and the B layer is 50,000 or more and 10,000,000 or less, more preferably 100,000 or more and 5,000,000 or less, and most preferably 150,000 or more and 1,000,000 or less. When the molecular weight of polypropylene is 50,000 or more, the melt index of the polyolefin microporous membrane does not become too high, which can prevent melting upon hot pressing. Moreover, the polyolefin microporous membrane having an excellent short-circuit resistance of a battery in the nail puncture test can be provided. The reason is not bounded by any theory, but it is assumed that even if the battery is short-circuited due to membrane rupture and a temperature of the battery rises, flowability of the molten separator is low due to the entanglement of the molecular chains, which can prevent a quick drop in insulation. The excellent short-circuit resistance of the battery under such severe conditions is advantageous, for example, in the field of in-vehicle batteries, etc., where a separator is required to have a higher level of safety. When the molecular weight of polypropylene is 10,000,000 or less, an excessive heat shrinkage can be prevented because the internal stress upon stretching does not become too large. Further, the molecular weight distribution (Mw/Mn) of polypropylene is preferably 30 or less, more preferably 24 or less, and most preferably 12 or less. When the molecular weight distribution of the polypropylene is 30 or less, miscibility with polyethylene is improved because of the less content of a low molecular weight polypropylene component, and a polyolefin microporous membrane derived from polypropylene having a higher heat resistance, can be obtained.

The polypropylenes contained in the A layer and the B layer are each preferably a homopolymer. The amount of the homopolymer is preferably 90% by weight or more, more preferably 95% by weight or more, still more preferably 98% by weight or more, and most preferably 100% by weight (all), based on the total weight of polypropylenes in the entire polyolefin microporous membrane. When the homopolymer is 90% by weight or more, further melting of the microporous membrane due to a temperature rise when short-circuited can be prevented. Moreover, since the homopolymer has a high crystallinity, phase separation from the plasticizer is likely to proceed, and a membrane having a preferred porosity and high permeability is likely to be obtained. For this reason, it is possible to preferably influence on the output and cycle characteristics. Furthermore, the homopolymer has few amorphous portions, and thus is capable of preventing an increase in thermal shrinkage due to shrinkage of an amorphous portion produced by heating below the melting point or by residual stress, and is also capable of preventing a reduction of permeability and cycle characteristics due to the shrinkage of the amorphous portion. Although not limited to any applications, this effect is remarkable in a separator of laminate type secondary batteries, which require a step of fusing the separator having an adhesive layer with electrodes by hot pressing.

The proportion of the thickness of the B layer to the total thickness of the polyolefin microporous membrane is preferably 10% or more and 50% or less, more preferably 15% or more and 45% or less, and still more preferably 20% or more and 40% or less.

The A layer and B layer may contain resins, such as polyethylene terephthalate, polycycloolefin, polyether sulfone, polyamide, polyimide, polyimide amide, polyaramid, nylon, polytetrafluoroethylene, polyvinylidene difluoride, etc., in addition to the polyolefins listed above.

<GPC Measurement>

The proportion of molecules having a molecular weight of 3,000,000 or more, in an integration curve of gel permeation chromatography (GPC) measurement of polyolefin microporous membrane, is preferably 10% by weight or less, more preferably 9% by weight or less, still more preferably 8% by weight or less, and preferably 3% by weight or more, more preferably 5% by weight or more. Moreover, the proportion of molecules having a molecular weight of 30,000 or less, in the integration curve of the gel permeation chromatography (GPC) measurement of the polyolefin microporous membrane, is preferably 3% by weight or less, more preferably 2.8% by weight or less, most preferably 2.5% by weight or less, and preferably 0.5% by weight or more, more preferably 0.8% by weight or more. When the high molecular weight polyethylene component is 10% by weight or less, the viscosity of the polyolefin microporous membrane does not become too high, which can secure the shutdown function. Further, when the polyethylene component having a low molecular weight is 3.0% by weight or less, it is possible to prevent the polyolefin microporous membrane from clogging up the pores thereof upon hot pressing and lowering the permeability.

<Inorganic Particle>

The content of the inorganic particles in the layer B is preferably less than 5% by weight, more preferably less than 3% by weight, and most preferably no inorganic particles are contained. When the content of the inorganic particles is less than 5% by weight, it is possible to effectively prevent batteries from swelling, etc., due to gas generation. This effect becomes more remarkable in a laminated battery, which the external body thereof is easily deformed. Further, when the B layer contains inorganic particles in an amount of 5% by weight or more, mechanical safety tend to be lowered due to a decrease in elongation, since the inorganic particles can be a starting point of breakage, or cycle characteristics tend to be deteriorated due to disorder in pore uniformity, which is not preferred.

The inorganic material is not particularly limited, but includes, for example: oxide-based ceramics, such as alumina, silica (silicon oxide), titania, zirconia, magnesia, ceria, yttria, zinc oxide, iron oxide, etc.; nitride-based ceramics, such as silicon nitride, titanium nitride, boron nitride, etc.; ceramics, such as silicon carbide, calcium carbonate, aluminum sulfate, barium sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, kieselguhr, silica sand, etc.; and glass fibers. These may be used alone or in combination of two or more. Among these, preferable inorganic particle is at least one selected from the group consisting of silica, alumina and barium sulfate is preferable from the viewpoint of electrochemical stability.

<Thermal Shrinkage>

The polyolefin microporous membrane of the present embodiment has a thermal shrinkage in TD at 120° C. of 10% or more and 40% or less, preferably 15% or more and 35% or less, and more preferably 20% or more and 30% or less, which is measured under a constant load applied to the MD. The inventors have found that, for example, in the case of a laminate type battery comprising a wound body, which is obtained by winding a laminate of electrodes and a separator in a flat shape in MD, the separator is wound in MD and thus is constrained in MD during hot pressing. Therefore, when the thermal shrinkage in TD measured as described above is 40% or less, the short-circuiting upon adhesion pressing can be effectively prevented. Further, when the thermal shrinkage is 10% or more, the deflection of the polyolefin microporous membrane and the battery molding failure can be effectively prevented. Furthermore, in one embodiment, when the TD heat shrinkage of the membrane being constrained in MD is within the above range, decrease in voltage can be moderated since it is assumed that a short-circuited portion in the periphery of a nail hardly spread even if the battery temperature rises in the nail puncture test.

<Melt Index (MI)>

The polyolefin microporous membrane of the present embodiment has a melt index (MI) under a load of 21.6 kgf at 190° C., which is preferably 0.01 g/10 min or more and 3.0 g/10 min or less, more preferably 0.05 g/10 min or more and 1.5 g/10 min or less, still more preferably 0.1 g/10 min or more and 0.6 g/10 min or less, and most preferably 0.12 g/10 min or more and 0.5 g/10 min or less. When the melt index is 0.1 g/10 min or more, the flowability upon melting is high and the shutdown function becomes favorable. It is assumed that when the melt index is 0.6 g/10 min or less, a sudden drop in insulation can be prevented, since even if the battery is short-circuited due to membrane rupture and the battery temperature rises, the flowability of the molten separator is low, which is preferable. The MI of the polyolefin microporous membrane can be controlled by the type, proportion, viscosity-average molecular weight, and molecular weight distribution of the polyolefin raw materials used.

In the polyolefin microporous membrane of the present embodiment, the MI of the A layer under a load of 21.6 kgf at 190° C. is preferably 0.30 g/10 min or less, more preferably 0.26 g/10 min or less, further preferably 0.22 g/10 min or less, and preferably 0.01 g/10 min or more, more preferably 0.03 g/10 min or more, and further preferably 0.06 g/10 min or more. It is assumed that the MI of the A layer of 0.30 g/min or less enables the battery to hold the shape even if the temperature in the battery rises upon short-circuiting, and can prevent a short-circuit area from increasing, and thus can prevent thermal runaway.

In the polyolefin microporous membrane of the present embodiment, the MI of the B layer under a load of 21.6 kgf at 190° C. is preferably more than 0.3 g/min, more preferably more than 0.35 g/min, further preferably more than 0.40 g/min, and preferably 2.0 g/min or less, more preferably 1.8 g/min or less, and further preferably 1.6 g/min or less. It is assumed that the MI of the B layer of more than 0.3 g/min enables a membrane to quickly melt and shutdown when the temperature inside the battery rises due to short-circuiting, which can increase the resistance and inhibit heat generation. It is assumed that when the MI of the B layer is 2.0 g/min or less, the molten resin cannot flow even if the temperature in the battery rises due to short-circuiting, which can prevent the short-circuited area from increasing.

In the polyolefin microporous membrane of the present embodiment, the ratio of MI of the B layer to that of the A layer (MI of B layer/MI of A layer) is preferably 1.5 or more, more preferably 1.8 or more, further preferably 2.1 or more, and preferably 20.0 or less, more preferably 18.0 or less, and further preferably 16.0 or less. It is assumed that when the ratio of MI of the B layer to that of the A layer is 1.5 or more, the resistance is increased by the molten B layer penetrating into the pores of the A layer when the temperature in the battery rises due to short-circuiting, which can prevent a rapid drop in voltage, while maintaining and supporting the shape of the A layer. When the ratio of MI of the B layer to that of the A layer is 20.0 or less, the affinity of the interface between the A layer and the B layer can be ensured, which can stabilizes the layer structure.

<Shutdown Characteristics>

The polyolefin microporous membrane of the present embodiment preferably has a shutdown response time of 8 seconds or longer and 30 seconds or shorter, more preferably 12 seconds or longer and 22 seconds or shorter, still more preferably 14 seconds or longer and 20 seconds or shorter, and even still more preferably 16 seconds or longer and 18 seconds or shorter. In the present description, "shutdown response time" refers to time until an electrical resistance value reaches from $10^2 \Omega$ to $10^3 \Omega$ in the shutdown characteristic test described in Examples. When the shutdown response time is 12 seconds or longer, it is possible to prevent a decrease in permeability due to clogged micropores upon hot pressing. A shutdown response time of 22 seconds or shorter is preferable since the safety can be further enhanced, which is required for in-vehicle applications.

The polyolefin microporous membrane of the present embodiment has a shutdown temperature of preferably 200° C. or lower, more preferably 170° C. or lower, and still more preferably 150° C. or lower, and preferably 135° C. or higher, more preferably 138° C. or higher, and even more preferably 140° C. or more. Further, the membrane rupture temperature of the polyolefin microporous membrane of the present embodiment, is preferably 100° C. or higher, more preferably 130° C. or higher, further preferably 150° C. or higher, even further preferably 170° C. or higher, and most preferably higher than 170° C., and preferably 300° C. or lower, more preferably 280° C. or lower. In the present description, "shutdown temperature" is a value obtained by rounding off the first decimal place of the temperature value when an electrical resistance value of the microporous film once reached $10^3 \Omega$ in the shutdown characteristic test described in Examples. In the description of the present application, the "membrane rupture temperature" refers to, in the shutdown characteristic test described in Examples, a temperature at the time when an electrical resistance value again falls below $10^3 \Omega$ after the rupture of the membrane with pores that are clogged due to an elevated temperature after the shutdown. It is preferable that the shutdown temperature of the polyolefin microporous membrane is 150° C. or lower and the membrane rupture temperature is higher than 170° C., since thermal runaway upon an internal short-circuiting of the battery can be prevented. When the shutdown temperature is 135° C. or higher, a decrease in permeability upon adhesion pressing can be prevented.

The polyolefin microporous membrane of the present embodiment has a puncture strength (gf/10 μm) per 10 μm membrane thickness of preferably 170 gf/10 μm or more, more preferably 180 gf/10 μm or more, still more preferably 190 gf/10 μm or more, and preferably 1500 gf/10 μm or less, more preferably 1300 gf/10 μm or less. When the puncture strength is 170 gf/10 μm or more and a laminated battery is fabricated by using such a microporous polyolefin membranes, microthinning and membrane rupture upon contact with the uneven portion of the electrode surface can be inhibited, which can reduce battery failure due to a micro-short-circuit. Although not limited to any applications, this effect becomes remarkable in a separator of laminate type secondary batteries, which requires a step of fusing the separator having an adhesive layer with electrodes by hot pressing.

The polyolefin microporous membrane of the present embodiment has an air permeability (sec/100 cc) of preferably 30 sec/100 cc or longer, more preferably 40 sec/100 cc or longer, still more preferably 50 sec/100 cc or longer, and preferably 500 sec/100 cc or shorter, more preferably 400 sec/100 cc or shorter, further preferably 300 sec/100 cc or shorter, even further preferably 200 sec/100 cc or shorter, and most preferably 100 sec/100 cc or shorter. The air permeability of 30 sec/100 cc or longer is capable of preventing a micro-short-circuiting of the battery. The air permeability of 500 sec/100 cc or shorter enables to secure an output of the battery.

<Tensile Strength at Break and Tensile Elongation>

The polyolefin microporous membrane of the present embodiment has a tensile strength at break in TD of 100 kgf/cm$^2$ or more and 5000 kgf/cm$^2$ or less, more preferably 300 kgf/cm$^2$ or more and 3000 kgf/cm$^2$ or less, and even more preferably 500 kgf/cm$^2$ or more and 2000 kgf/cm$^2$ or less. The tensile strength at break in TD of 100 kgf/cm$^2$ or more enables to reduce the possibility of separator rupture when the battery is deformed by an external force, etc. It is preferable that the tensile strength at break in TD is 5000 kgf/cm$^2$ or less, since the residual stress can be reduced, which can prevent the thermal shrinkage. This effect becomes more remarkable in a laminate type battery in which the external body is prone to be deformed.

The polyolefin microporous membrane of the present embodiment preferably has a tensile elongation in TD of 10% or more and 500% or less, more preferably 30% or more and 300% or less, and even more preferably 50% or more and 200% or less. The elongation in TD of 10% or more enables to reduce the possibility of separator rupture when the battery is deformed by an external force, etc. Moreover, it also enables to reduce the possibility of battery failure due to a micro-short-circuiting via pinholes in the polyolefin microporous membrane created by distortion of a micro segment generated when the microporous polyolefin membrane and electrodes are laminated in the presence of fine foreign substances. The TD elongation of 500% or less enables to prevent the separator from tearing in the longitudinal direction (tearing in MD) when the battery is deformed by an external force, etc., since the separator is not oriented too much in MD. This effect becomes more remarkable in a laminate type battery in which the exterior body is prone to be deformed.

<Other Properties>

The polyolefin microporous membrane preferably has a small electron conductivity, an ionic conductivity, a high resistance to an organic solvent, and a fine pore size. Moreover, the polyolefin microporous membrane can be utilized as a separator for lithium ion secondary batteries, and in particular, can be preferably used as a separator for laminate type lithium ion secondary batteries.

The thickness of the polyolefin microporous membrane is preferably 0.1 µm or more and 100 µm or less, more preferably 1 µm or more and 50 µm or less, further preferably 3 µm or more and 25 µm or less, still more preferably 15 µm or less, and most preferably 10 µm or less. The thickness of the polyolefin microporous membrane is preferably 0.1 µm or more from the viewpoint of mechanical strength, and preferably 100 µm or less from the viewpoint of increasing a capacity of lithium ion secondary batteries. The total thickness of the polyolefin microporous membrane can be adjusted, for example, by controlling a die lip gap, stretching ratio in a stretching step, etc.

The average pore size of the polyolefin microporous membrane is preferably 0.03 µm or more and 0.70 µm or less, more preferably 0.04 µm or more and 0.20 µm or less, and still more preferably 0.05 µm or more and 0.10 µm or less. The average pore size of the polyolefin microporous membrane is preferably 0.03 µm or more and 0.70 µm or less from the viewpoint of high ion conductivity and voltage resistance. The average pore size can be adjusted by controlling the composition ratio of polyolefin, cooling rate of an extruded sheet, stretching temperature, stretching ratio, heat setting temperature, stretching ratio upon heat setting, and relaxation ratio upon heat setting, and by combining these.

The porosity of the polyolefin microporous membrane is preferably 25% or more and 95% or less, more preferably 30% or more and 65% or less, and still more preferably 35% or more and 55% or less. The porosity of the polyolefin microporous membrane is preferably 25% or more from the viewpoint of improving ion conductivity, and preferably 95% or less from the viewpoint of voltage resistance characteristics. The porosity of the polyolefin microporous membrane can be controlled by the mixing ratio of the polyolefin resin composition and the plasticizer, stretching temperature, stretching ratio, heat setting temperature, stretching ratio upon heat setting, and relaxation ratio upon heat setting, and by combining these.

The polyolefin microporous membrane has a viscosity-average molecular weight (Mv) of preferably 30,000 or more and 12,000,000 or less, more preferably 50,000 or more and 2,000,000 or less, still more preferably 100,000 or more and 1,000,000 or less, and most preferably 500,000 or more and 900,000 or less. The viscosity-average molecular weight of 30,000 or more is preferable, since the melt tension upon melt-molding is improved and moldability becomes preferable, and the polyolefin microporous membrane having a high strength tends to be obtained due to entanglement between polymers. When the viscosity-average molecular weight is 12,000,000 or less, uniform melt-kneading is facilitated, which is preferable because it can lead to excellent sheet formability, in particular thickness stability. Furthermore, the viscosity-average molecular weight of less than 1,000,000 is preferable when the polyolefin resin porous membrane is used as a separator for secondary batteries, since pores thereof are prone to be clogged up when a temperature rises, which is preferable because preferable shutdown function tends to be achieved.

<<Production Method of Polyolefin Microporous Membrane>>

Methods for producing a polyolefin microporous membrane are not particularly restricted, and publicly known production methods can be used. The method includes, for example, the following methods:

(1) A method comprising melt-kneading a polyolefin resin composition and a pore-forming material to mold them into a sheet, optionally stretching the sheet, and then extracting the pore-forming material therefrom to produce a porous sheet;

(2) A method comprising melt-kneading a polyolefin resin composition, extruding it at a high stretching ratio, and heat treating and stretching it to separate polyolefin crystal interfaces to make it porous;

(3) A method comprising melt-kneading a polyolefin resin composition and an inorganic filler to mold them into a sheet, stretching the sheet to separate interfaces between the polyolefin and the inorganic filler to make it porous;

(4) A method comprising dissolving a polyolefin resin composition and then immersing it in a poor solvent for the polyolefin to solidify the polyolefin and simultaneously remove the solvent, thereby make it porous.

Hereinafter, as an example of the methods for producing a polyolefin microporous membrane, the method (1), in which a polyolefin resin composition and a pore-forming material are melt-kneaded to be molded into a sheet and the pore-forming material is extracting therefrom, will be described.

First, the polyolefin resin composition used for an A layer and the pore-forming material are melt-kneaded to obtain a melt-kneaded product A, and a polyolefin resin composition used for a B-layer and the pore-forming material are melt-kneaded to obtain a melt-kneaded product B. A method for melt-kneading includes, for example, a method comprising feeding a polyolefin resin and optionally other additives into a resin-kneading apparatus, such as an extruder, kneader, laboplastomill, kneading roll, Banbury mixer, etc., and introducing and kneading a pore-forming material at an arbitrary ratio while heat-melting the resin components.

The pore-forming material may include a plasticizer, an inorganic material, or combination thereof.

Although the plasticizer is not particularly restricted, a non-volatile solvent that can form a uniform solution above the melting point of polyolefin is preferably used. Such a non-volatile solvent include, for example, hydrocarbons, such as liquid paraffin, paraffin wax, etc.; esters, such as dioctyl phthalate, dibutyl phthalate, etc.; and higher alcohols, such as oleyl alcohol, stearyl alcohol, etc. These plasticizers may be recovered by distillation, etc., after extraction, and reutilized. Furthermore, the polyolefin resin, other additive and plasticizer are preliminarily kneaded at a prescribed ratio by using a Henschel mixer, etc., before introduced into the resin-kneading apparatus. More preferably, in the pre-kneading, only a portion of the plasticizer to be used is fed, and the remaining plasticizer is side-fed into the resin kneading apparatus and kneaded while being appropriately heated. By using such kneading methods, the dispersibility of the plasticizer is improved, and when stretching a melt-kneaded product of the resin composition and the plasticizer into a sheet in a later step, it tends to be stretchable at a high ratio without a membrane rupture.

The plasticizer is preferably a liquid paraffin, because when the polyolefin resin is polyethylene or polypropylene, liquid paraffin is highly compatible with them, and even when the melt-kneaded product is stretched, interfacial separation between the resin and the plasticizer hardly occurs, which is prone to facilitate uniform stretching.

The ratio of the polyolefin resin composition to the pore-forming material is not particularly limited provided that these can be melt-kneaded uniformly to be mold into a sheet form. For example, the weight fraction of the pore-forming material in the composition consisting of the polyolefin resin composition and the pore-forming material is preferably 20% by weight or more, more preferably 25% by weight or more, further more preferably 30% by weight or more, and preferably 38% by weight or less, more preferably 36% by weight or less, and further more preferably 34% by weight or less. When the weight fraction of the pore-forming material is 38% by weight or less, the melt tension upon melt-molding tends to be enough to improve the moldability. Moreover, a decrease in the molecular weight due to an increase in the excessive stress upon kneading can be prevented, and thus MI of polyolefin microporous membrane can be more easily controlled. On the other hand, when the weight fraction of the pore-forming material is 20% by weight or more, no scission of the polyolefin molecules occurs even when the mixture of the polyolefin resin composition and the pore-forming material is stretched at a high ratio, which can facilitates forming of a uniform and fine structure and increase the strength.

The inorganic material used for the pore-forming material is not particularly limited, but include, for example: oxide-based ceramics, such as alumina, silica (silicon oxide), titania, zirconia, magnesia, ceria, yttria, zinc oxide, iron oxide, etc.; nitride-based ceramics, such as silicon nitride, titanium nitride, boron nitride, etc.; ceramics, such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, kieselguhr, silica sand, etc.; and glass fibers. These may be used alone or in combination of two or more. Among these, silica, alumina and titania are preferable from the viewpoint of electrochemical stability, with silica being more preferable from the viewpoint of facilitating extraction.

The ratio of the inorganic material as a pore-forming material in the polyolefin resin composition is preferably 5% by weight or more relative to the total weight thereof, and more preferably 10% by weight or more from the viewpoint of achieving favorable separation, and it is preferably 99% by weight or less and more preferably 95% by weight or less from a viewpoint of ensuring high strength.

Then, the melt-kneaded products A and B of the resin compositions and the pore-forming materials are co-molded into a sheet that is laminated in the order of melt-kneaded product B—melt-kneaded product A—melt-kneaded product B, to obtain a sheet molded body. A method for producing the sheet molded body includes, for example: a method including co-extruding a melt-kneaded product into sheet form through a T die, etc., bringing it into contact with a heat conductor, and cooling to a temperature sufficiently lower than the crystallization temperature of the resin component to solidify it; and a method including extruding the melt-kneaded product A and melt-kneaded product B separately, bringing them into contact with a heat conductor and cooling to form each sheet, and then laminated them in the order of melt-kneaded product B—melt-kneaded product A—melt-kneaded product B. The heat conductor used for cooling and solidification includes a metal, water, air, plasticizer, etc. Among them, a metal roll is preferred to be used because of the high heat conduction efficiency. Moreover, when the extruded kneaded-product contacts with the metal roll, it is preferable that the product is sandwiched between rolls since the efficiency of heat conduction is enhanced as well as the sheet is oriented, which increases the membrane strength, and the surface smoothness of the sheet also tends to be increased. In co-extruding of the melt-kneaded products into a sheet form from the T die, the die lip gap is preferably 200 μm or more and 3,000 μm or less, and more preferably 500 μm or more and 2,500 μm or less. When the die lip gap is 200 μm or more, resin wastes, etc., are reduced, the influence on the membrane quality, such as streaks and defects is small, and the risk of the membrane rupture, etc., in the subsequent stretching step can be reduced. On the other hand, when the die lip gap is 3,000 μm or less, the cooling rate is fast, which enables to prevent cooling unevenness, and the thickness stability of the sheet can be maintained.

Moreover, the sheet molded body may be also subjected to rolling. The rolling can be carried out by, for example, a press method by using a double belt press machine, etc. By rolling the sheet molded body, a degree of orientation, in particular, orientation of the surface layer can be increased. The rolling ratio by area is preferably more than 1 time and 3 times or less, and more preferably more than 1 time and 2 times or less. When the rolling ratio is more than 1 time, the plane orientation is increased and the membrane strength of the finally obtained porous membrane tends to be increased. On the other hand, when the rolling ratio is 3 times or less, the difference in orientation between the surface layer portion and the inside of the center is small, which tends to facilitate formation of a porous structure that is uniform in the thickness direction of the membrane.

Then, the pore-forming material is removed from the sheet molded body to form a polyolefin porous membrane. A method for removing the pore-forming material includes, for example, a method including immersing the sheet molded body in an extraction solvent to extract the pore-forming material and adequately drying it. The pore-forming material may be extracted either batchwise or continuously. In order to prevent shrinkage of the porous material, it is preferable to constrain edges of the sheet molded body during a series of steps, such as immersion and drying. Moreover, it is preferable to adjust the amount of residual pore-forming material in the porous membrane to less than 1% by weight with respect to the weight of the entire porous membrane.

As an extraction solvent used when extracting the pore-forming material, it is preferable to use a solvent which is a poor solvent for the polyolefin resin and is a good solvent for the pore-forming material and has a boiling point lower than the melting point of the polyolefin resin. Such extraction solvents include, for example, hydrocarbons, such as n-hexane, cyclohexane, etc.; halogenated hydrocarbons, such as methylene chloride, 1,1,1-trichloroethane, etc.; non-chlorinated halogenated solvents, such as hydrofluoroether, hydrofluorocarbon, etc.; alcohols, such as ethanol, isopropanol, etc.; ethers, such as diethyl ether, tetrahydrofuran, etc.; and ketones, such as acetone, methyl ethyl ketone, etc. Such extraction solvents may be recovered by distillation, etc., and reutilized. Moreover, when an inorganic material is used for the pore-forming material, an aqueous solution of sodium hydroxide, potassium hydroxide, etc., may be used for the extraction solvent.

Moreover, the sheet molded body or the polyolefin microporous membrane is preferably subjected to stretching. The stretching may be carried out before extracting the pore-forming material from the sheet molded body. Moreover, the stretching may also be carried out for the polyolefin microporous membrane in which the pore-forming material was extracted from the sheet molded body. Furthermore, it may be carried out before and after extracting the pore-forming material from the sheet molded body. A stretching method includes, for example: a method including uniaxial stretching, simultaneous biaxial stretching, sequential biaxial stretching, multistage stretching, multiple-time stretching, etc. Simultaneous biaxial stretching is preferable from the viewpoint of improvement in puncture strength, uniformity of stretching, and fuse property. Further, from the viewpoint of controllability of plane orientation, sequential biaxial stretching is preferred. When the sheet molded body is biaxially stretched at a high stretching ratio, the molecules are oriented in a plane direction, and the finally obtained porous membrane is tend to hardly tears and has high puncture strength.

Simultaneous biaxial stretching refers to a stretching method in which stretching in MD (the machine direction of a continuous processing of the microporous membrane) and stretching in TD (the transverse direction crossing the MD of the microporous membrane at an angle of) 90° are simultaneously carried out, and the stretching ratio in each direction may be different. Sequential biaxial stretching refers to a stretching method in which stretching in MD and stretching in TD are each carried out independently, and upon MD stretching or TD stretching, the other direction is in a non-constrained state or in anchored state with fixed length.

The temperature upon stretching of the sheet molded body or the polyolefin microporous membrane is preferably 116° C. or higher, more preferably 118° C. or higher, and further preferably 120° C. or higher. The temperature upon stretching is preferably 129° C. or lower, more preferably 127° C. or lower, and further preferably 125° C. or lower. The temperature upon stretching, particularly the temperature during biaxial stretching of 116° C. or higher can impart sufficient strength to the polyolefin microporous membrane. Moreover, it enables to prevent an increase in thermal shrinkage due to excessive residual stress. The temperature upon stretching, particularly the temperature upon biaxial stretching of 129° C. or lower can inhibit non-uniformity of the pore size distribution due to melting of the membrane surface, securing cycle performance when the battery is repeatedly charged and discharged. Moreover, it is preferred since the surface condition can be uniform, which can prevent an adhesion condition from being non-uniform when hot pressing a membrane having an adhesive layer with electrodes. Although not limited to any applications, this effect becomes remarkable when the separator is used as a separator for laminate type secondary batteries, which require a step of fusing the separator having an adhesive layer with electrodes by hot pressing.

The stretching ratio is preferably in the range of 20 times or more and 100 times or less in terms of a ratio by area, more preferably in the range of 25 times or more and 70 times or less, and furthermore preferably in the range of 30 times or more and 50 times or less. The stretching ratio in each axial direction is preferably in the range of 4 times or more and 10 times or less in MD and 4 times or more and 10 times or less in TD, more preferably in the range of 5 times or more and 8 times or less in MD and 5 times or more and 8 times or less in TD, and furthermore preferably in the range of 5 times or more and 7 times or less in MD and 5 times or more and 7 times or less in TD. When the total ratio by area is 20 times or more, the strength of the obtained polyolefin microporous membrane tends to be further enhanced. On the other hand, when the total ratio by area is 100 times or less, the membrane shrinkage can be prevented because the residual stress does not become too large, a decrease in tensile elongation at break can be prevented, and further excessively large pores can be avoided.

In order to prevent a shrinkage of the polyolefin microporous membrane, heat treatment can also be carried out with the aim of heat setting after the stretching step or after formation of the polyolefin microporous membrane. Further, the polyolefin microporous membrane may be subjected to post-treatments, such as hydrophilic treatment with a surfactant, etc., and crosslinking treatment with ionizing radiation, etc.

From the viewpoint of prohibiting a shrinkage, the polyolefin microporous membrane is preferably heat set by subjecting it to heat treatment. A method of the heat treatment includes, for example: a stretching step carried out at a prescribed temperature atmosphere and prescribed stretching ratio in order to adjusting physical properties and/or a relaxation step carried out at a prescribed temperature atmosphere and prescribed relaxation ratio in order to reduction of stretching stress. The relaxation step may be carried out after the stretching step. These heat treatments can be carried out by using a tenter or a roll stretcher.

In order to obtain a polyolefin microporous membrane having higher strength and higher porosity, the ratio in MD and/or TD of the membrane in the stretching step is preferably 1.1 times or more, and more preferably 1.2 times or more, and preferably less than 2.3 times, more preferably less than 2.0 times. Moreover, when stretching in both MD and TD upon heat treatment, the product of the stretching ratios in MD and TD is preferably less than 3.5 times and more preferably less than 3.0 times, when the stretching ratios in MD and/or TD upon heat treatment is 1.1 times or more, it is possible to obtain the effects of increasing porosity and reducing thermal shrinkage. The stretching ratio of 2.3 times or less enables to prevent an excessive large pore size and a decrease in tensile elongation at break. When the product of the stretching ratios in MD and TD upon heat treatment is less than 3.5 times, an increase in thermal shrinkage can be prohibited. The strain rate upon stretching is preferably 3%/sec or more and 15%/sec or less, more preferably 4%/sec or more and 13%/sec or less, and most preferably 5%/sec or more and 11%/sec or less. The relaxation step is a step of shrinking the membrane in MD and/or TD. The relaxation ratio is a value obtained by dividing the dimension of the membrane after the relaxation step by the dimension of the membrane before the relaxation step. When the relaxation is carried out in both MD and TD, the relaxation ratio refers to a value obtained by multiplying the relaxation ratio in MD and the relaxation ratio in TD. The relaxation ratio is preferably less than 1.0, more preferably less than 0.97, still more preferably less than 0.95, and most preferably less than 0.90. The relaxation ratio is preferably 0.4 or more, more preferably 0.6 or more, and still more preferably 0.8 or more, from the viewpoint of membrane quality. The absolute value of the strain rate upon relaxation is preferably 0.4%/sec or more and 6.0%/sec or less, more preferably 0.5%/sec or more and 5.0%/sec or less, and most preferably 0.6%/sec or more and 4.0%/sec or less. Although the relaxation step may be carried out in both directions of MD and TD, it may be carried out in either MD or TD. By carrying out stretching and relaxation at the above stretching ratios and strain rates, the thermal shrinkages in MD and/or TD can be controlled within a preferred range.

The stretching and relaxation steps after the extraction of plasticizer are preferably carried out in TD. The temperature in the stretching and relaxation step is preferably from a weighted average value of the melting point (hereinafter also referred to as "Tm") of the polyolefin resin contained in the B layer minus 10° C. to the weighted average value plus 10° C. or lower, more preferably from the weighted average value minus 9° C. to the weighted average value plus 5° C. or lower, and furthermore preferably from the weighted average value of minus 8° C. to the weighted average value plus 1° C. or lower. When the B layer contains a plurality of polyolefin resins, the weighted average of the melting point can be obtained from the melting point obtained by differential scanning calorimetry (DSC) measurement of each raw material and the weight fraction of each raw material contained in the B layer. When the temperature in the stretching and relaxation steps is in the above range, the thermal shrinkage in TD can be controlled within a preferable range while maintaining the permeability.

<Formation of Adhesive Layer>

In order to prevent deformation and swelling of the laminate type battery due to gas generation, an adhesive layer containing a thermoplastic resin can be disposed on the surface of the polyolefin microporous membrane. The thermoplastic resin contained in the adhesive layer is not particularly limited, but includes, for example: polyolefins, such as polyethylene, polypropylene, etc.; fluorine-containing resins, such as polyvinylidene difluoride, polytetrafluoroethylene, etc.; fluorine-containing rubbers, such as vinylidene fluoride-hexafluoropropylene copolymer, vinylidene fluoride-tetrafluoroethylene copolymer, vinylidene fluoride-hexafluoropropylene tetrafluoroethylene copolymer, ethylene-tetrafluoroethylene copolymer, etc.; rubbers, such as styrene-butadiene copolymer and hydride thereof, acrylonitrile-butadiene copolymer and hydride thereof, acrylonitrile-butadiene-styrene copolymer and hydride thereof, (meth)acrylic acid ester copolymer, styrene-acrylic acid ester copolymer, acrylonitrile-acrylic acid ester copolymer, ethylene propylene rubber, polyvinyl alcohol, polyvinyl acetate, etc.; cellulose derivatives, such as ethyl cellulose, methyl cellulose, hydroxyethyl cellulose, carboxymethyl cellulose, etc.; resins having a melting point and/or glass transition temperature of 180° C. or higher, such as polyphenylene ether, polysulfone, polyether sulfone, polyphenylene sulfide, polyether imide, polyamideimide, polyamide, polyester, etc.

The method for forming the adhesive layer on the surface of the polyolefin microporous membrane is not particularly limited, and a publicly known method described in Japanese Patent Publication No. 3839706, Japanese Unexamined Patent Publication No. 2013-203894 or Japanese Translation of PCT International Application Publication No. 2015-512124, etc., can be used.

<<Laminate Type lithium Ion Secondary Battery>>

The laminate type lithium ion secondary battery of the present embodiment has at least one structure in which a positive electrode and a negative electrode are laminated via the polyolefin porous membrane of the present embodiment in an external body consisting of a laminated film.

As a laminated film, a film in which a metal foil and a resin film are laminated, is generally used, and such a laminated film includes, for example, a laminated film consisting of three layers of an outer layer resin film/metal foil/inner layer resin film. The outer layer resin film is used for preventing the metal foil from being damaged by contact, etc., and the resin includes, for example, resins, such as nylon, polyester, etc. The metal foil is used for preventing moisture and gas permeation, and the foil includes, for example, copper, aluminum, stainless steel foil, etc. The inner layer resin film protects the metal foil from the electrolytic solution contained therein, and melts and adheres to seal an opening upon heating, and such a resin includes, for example, polyolefin and acid-modified polyolefin.

EXAMPLES

The present embodiment will be described below in more detail by way of Examples and Comparative Examples, and the present invention is not limited to these Examples and Comparative Examples.

<<Tests and Evaluation Methods>>

<Proportion of Polypropylene>

The proportion of polypropylene contained in the polyolefin microporous membrane can be determined by infrared spectroscopy (IR) or Raman spectroscopy. For example, in order to calculate the proportion of polypropylene to polyethylene, the IR spectrum of a 1473 $cm^{-1}$ peak derived from polyethylene and a 1376 $cm^{-1}$ peak derived from polypropylene are used as marker bands thereof, and the proportion of polypropylene can be calculated based on a calibration curve prepared from samples with known polypropylene contents. When the proportion of polypropylene is different between the intermediate layer (A layer) and the surface layer (B layer), the proportion of polypropylene for each layer can be obtained, for example, by a method comprising calculating a proportion of polypropylene in a surface layer by a ATR-IR method, or by microscopic IR or microscopic Raman analysis of a cross section of the polyolefin microporous membrane.

<Gel Permeation Chromatography (GPC) of Polyolefin Microporous Membrane>

Sample Preparation

When inorganic particles are contained in the polyolefin microporous membrane, the polyolefin microporous membrane was immersed in caustic soda and heated to 90° C. for 30 minutes to remove the inorganic particles, and then washed with running water for 3 hours, and drying for 10 hours to prepare a sample. The sample was weighed, and 1,2,4-trichlorobenzene (TCB) as eluent was added so that the concentration thereof was 1 mg/ml. The sample was stored at 160° C. for 30 minutes by using a high-temperature dissolver, agitated at 160° C. for 1 hour, and visually confirmed that all of the samples were dissolved. The solution was filtered with a 0.5 μm filter while maintained at 160° C. to obtain a filtrate as a sample for a GPC measurement.

GPC Measurement

PL-GPC220 (trademark) manufactured by Agilent Technologies as an GPC apparatus and two 30 cm columns of TSK gel GMHHR-H(20) HT (trademark) manufactured by Tosoh Corporation were used, and 500 μl of a GPC measurement sample prepared as described above was injected into the measurement apparatus, and GPC measurement was carried out at 160° C. It is noted that a calibration curve was prepared by using commercially available monodisperse polystyrenes having known molecular weights as standard substances, and molecular weight distribution data converted for polystyrene for each sample were obtained. Based on that, the proportion of molecules having a molecular weight of 3,000,000 or more and the proportion of molecules having a molecular weight of 30,000 or less were obtained for each sample.

<Thermal Shrinkage (%) in TD with Constant Load Applied to MD>

Figure 2:
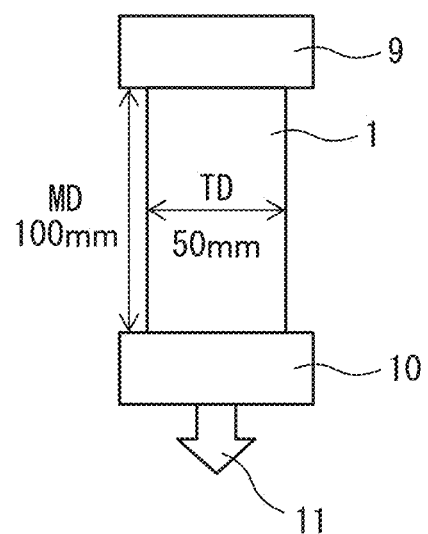
FIG. 2 is a schematic view explaining a measurement method of thermal shrinkage (%) in TD under a constant load applied in MD.

FIG. 2 is a schematic view explaining a method for measuring the thermal shrinkage (%) in TD in a state where a constant load is applied to the MD. The sample (1) was cut into a rectangle of 130 mm in MD and 50 mm in TD, one side of the short sides was fixed to a metal frame or metal rod with the heat-resistant tape (9) so that no wrinkles were created, and the other side was pinched with the clips (10) that is wider than the TD length of the sample, and was suspended with the clip on the bottom. The constant load (11) was applied to MD by hanging a weight on the clip. In this case, the distance from the lower end of the tape to the upper end of the clip was fixed to be 100 mm. Incidentally, when the sample with the above size cannot be obtained, a sample was cut out so that the TD length was as close to 50 mm as possible, and the sample was set so that the ratio of the distance from the lower end of the tape to the upper end of the clip to the length in TD was the same ratio (100 mm/50 mm). Moreover, since the stronger the membrane is, the stronger the tension upon cell winding is set, the constant load toward MD is determined according to the following equation:

$$\text{Load }(gf) = 0.01 \times \text{Sample puncture strength }(gf) \times \text{Sample length }(mm) \text{ in } TD$$

The sample with the weight was fed into a hot air dryer heated to a temperature of 120° C. The sample was set so as not to adhere to the inner wall, etc., of the dryer and not to fuse with each other. After 5 minutes, the sample was taken out, cooled to room temperature with the weight suspended, the length in TD was determined, and the thermal shrinkage was calculated according to the following equation:

$$\text{Thermal shrinkage (\%) in } TD = (\text{Length in } TD \text{before heating } (mm) - \text{Length in } TD \text{after heating } (mm))/\text{Length in } TD \text{before heating } (mm) \times 100$$

<Melt Index (MI) (g/10 minutes)>

According to JIS K7210: 1999 (plastic-thermoplastic melt mass flow rate (MFR) and melt volume flow rate (MVR)), the melt index (MI) of the polyolefin microporous membrane was measured. A load of 21.6 kgf was applied at 190° C., the amount of resin (g) that flowed out from an orifice having a diameter of 1 mm and a length of 10 mm in 10 minutes was measured, and the value rounded to the first decimal place was taken as MI. The melt index of the A layer or the B layer can be measured by stripping the layer of the laminated polyolefin microporous membrane, respectively.

<Shutdown Characteristics>

FIG. 1(A) shows a schematic diagram illustrating a measurement apparatus for a shutdown response time, shutdown temperature, and membrane rupture temperature (meltdown temperature). The sign 1 indicates a microporous film, the signs 2A and 2B indicate nickel foils having a thickness of 10 μm, and the sings 3A and 3B indicate glass plates, respectively. The sign 4 denotes an electrical resistance measurement apparatus (LCR meter "AG-4411" (trademark) manufactured by Ando Electric Co., Ltd.), which is connected to the nickel foils 2A and 2B. The sign 5 denotes a thermocouple, connected to the thermometer 6. The sign 7 denotes a data collector, connected to the electrical resistance measurement apparatus 4 and the thermometer 6. The sign 8 denotes an oven for heating the microporous film 1.

More specifically, as shown in FIG. 1(B), the microporous membrane 1 was overlaid on the nickel foil 2A, and longitudinally fixed with "Teflon" (registered trademark) tape (the hatched portion in the figure). The microporous film 1 impregnated with a 1 mol/liter lithium borofluoride solution (solvent: propylene carbonate/ethylene carbonate/γ-butyl lactone=1/1/2), was used as an electrolytic solution. As shown in FIG. 1(C), a "Teflon" (registered trademark) tape (the hatched portion in the figure) was adhered on the nickel foil 2B for masking, leaving a 15 mm×10 mm window at the center of the nickel foil 2B.

The nickel foil 2A and nickel foil 2B were combined in such a manner as to sandwich the microporous membrane 1 therebetween, and the two nickel foils were further sandwiched by the glass plates 3A and 3B on the both sides of the foils. In this case, the window portion of the foil 2B and the porous membrane 1 were positioned to be opposite to each other. The two glass plates 3A and 3B were fixed by pinching with a commercially available double clip. The thermocouple 5 was fixed to the glass plate with a "Teflon" (registered trademark) tape.

By using such an apparatus and the oven 8, the temperature when heating the microporous film 1, nickel foils 2A and 2B, glass plates 3A and 3B, and electrical resistance between the nickel foils 2A and 2B, were measured continuously. Here, the temperature was raised from 25° C. to 200° C. at a rate of 2° C./minute, and the electrical resistance value was measured with an alternating current of 1 kHz. The temperature at the time when the electrical resistance value of the microporous film once reached $10^3 \Omega$ was measured and rounded off at the first decimal place, which was taken as a shutdown temperature. Thereafter, the temperature at the time when the electrical resistance value again fell below $10^3\Omega$ was taken as a membrane rupture temperature. If the resistance value is greater than $10^3\Omega$ from the beginning, the temperature at the time when the resistance value fell below $10^3\Omega$ was defined as the membrane rupture temperature. The time until the electrical resistance value reached from $10^2\Omega$ to $10^3\Omega$ was defined as a shutdown response time.

<TD Tensile Test>

The tensile test in TD was carried out by using a tensile tester (Shimadzu Autograph AG-A type), and the strength when a sample was broken was divided by a cross-sectional area of the sample before the test to obtain a TD tensile strength at break (kg/cm$^2$). Measurement conditions are as follows: temperature: 23±2° C., humidity: 40%, sample shape: width 10 mm×length 100 mm, distance between chucks: 50 mm, and tensile speed: 200 mm/min. The tensile elongation (%) was obtained by dividing the amount of elongation (mm) up to breakage by the distance between chucks (50 mm) and then multiplying by 100.

<Viscosity-Average Molecular Weight (Mv)>

The intrinsic viscosity [η] at 135° C. in a decalin solvent based on ASTM-D4020 was measured. For polyethylene, the viscosity-average molecular weight was calculated according to the following equation.

$$[\eta]=6.77\times10^{-4} Mv^{0.67}$$

For polypropylene, the viscosity-average molecular weight was calculated according to the following equation.

$$[\eta]=1.10\times10^{-4} Mv^{0.80}$$

<Melting Point (° C.)>

By using a differential scanning calorimetry (DSC) measurement apparatus "DSC-60" (manufactured by Shimadzu Corporation), a temperature was raised from the room temperature to 200° C. at a rate of 10° C./min (a first temperature raising step), then lowered the temperature at 10° C./min to 30° C. (a first temperature lowering step), and again raised the temperature to 200° C. at a rate of 10° C./min, i.e., a second temperature raising step, and the temperature at the minimum point of the endothermic peak in the second temperature raising step was taken as a melting point. The value was rounded off at the first decimal place to obtain the melting point. When there were a plurality of types of polyolefin, the minimum point of each different endothermic peak was taken as the melting point. In general, polyethylene has a melting point between 120° C. and 140° C., and polypropylene has a melting point between 140° C. and 170° C., which are shown as an endothermic peak.

<Membrane Thickness (μm)>

The measurement was carried out by using a micro thickness gauge (type KBM, manufactured by Toyo Seiki Co., Ltd.) at room temperature of 23° C. and humidity of 40%. The measurement was carried out by using terminals having a terminal diameter of 5 mm under a load of 44 gf.

<Porosity (%)>

A 10 cm×10 cm square sample was cut out from the microporous membrane, the volume (cm$^3$) and weight (g) of the sample were measured, and the porosity was calculated based on them and the membrane density (g/cm$^3$) according to the following equation:

Porosity (%)=(Volume−Weight/Membrane density)/Volume×100

<Air Permeability (sec/100 cc)>

A permeability resistance of the polyolefin microporous membrane was measured by using a Gurley type air permeability tester G-B2 (trademark) manufactured by Toyo Seiki Co., Ltd., according to JIS P-8117, at temperature of 23° C. and humidity of 40%, and the permeability resistance was taken as air permeability.

<Puncture Strength (gf)>

A microporous membrane was fixed with a sample holder having an opening diameter of 11.3 mm, by using a handy compression tester KES-G5 (trademark) manufactured by Kato Tech Co., Ltd. Subsequently, a puncture test was carried out by contacting a needle with a tip of a curvature radius of 0.5 mm with the center of the fixed microporous membrane at a puncture speed of 2 mm/sec, an atmospheric temperature of 23° C. and humidity of 40%, to obtain a raw puncture strength (gf), which was taken as a maximum puncture load.

<Nail Puncture Evaluation>

A positive electrode, negative electrode, and electrolytic solution were prepared according to procedures a. to c. as follows.

a. Fabrication of Positive Electrode

A slurry was prepared by mixing 90.4% by weight of nickel-manganese-cobalt composite oxide (NMC) (Ni:Mn:Co=1:1:1 (ratio by element), density of 4.70 g/cm$^3$) as a positive electrode active material; 1.6% by weight of graphite powder (KS6) (density of 2.26 g/cm$^3$, number-average particle size of 6.5 μm) and 3.8% by weight of acetylene black powder (AB) (density of 1.95 g/cm$^3$, number-average particle size of 48 nm) as conductive auxiliary agents; and 4.2% by weight of polyvinylidene difluoride (PVDF) (density of 1.75 g/cm$^3$) as a binder; and dispersing them in N-methyl pyrrolidone (NMP). The slurry was coated on one surface of a 20 μm thick aluminum foil, which is used as a positive electrode current collector, by using a die coater, dried at 130° C. for 3 minutes, and then compression-molded by using a roll press machine to produce a positive electrode. The coating amount of the positive electrode active material was 109 g/m$^2$.

b. Fabrication of Negative Electrode

A slurry was prepared by dispersing 87.6% by weight of graphite powder A (density of 2.23 g/cm$^3$, number-average particle size of 12.7 μm) and 9.7% by weight of graphite powder B (density of 2.27 g/cm$^3$, number-average particle size of 6.5 μm) as negative electrode active materials; and 1.4% by weight (in terms of solid content) (solid content concentration of 1.83% by weight aqueous solution) of ammonium salt of carboxymethyl cellulose; and 1.7% by weight (in terms of solid content) (solid content concentration of 40% by weight aqueous solution) of a diene rubber-based latex as binders in purified water. The slurry was coated on one surface of a 12 μm thick copper foil, which is used as a negative electrode current collector, by using a die coater, dried at 120° C. for 3 minutes, and then compression-molded by using a roll press machine to produce a negative electrode. The coating amount of the negative electrode active material was 52 g/m$^2$.

c. Preparation of Nonaqueous Electrolytic Solution

A nonaqueous electrolytic solution was prepared by dissolving LiPF$_6$ as a solute to 1.0 mol/L in a mixed solvent of ethylene carbonate and ethyl methyl carbonate (at volume ratio of 1:2).

d. Formation of Adhesive Layer

According to the following procedures, an adhesive layer was formed on the polyolefin microporous membrane obtained in Examples and Comparative Examples. 64 parts of water and 0.25 parts of PELEX SS-L (45% solid content of sodium alkyldiphenyl ether disulfonate, manufactured by Kao Corporation) were charged into a reaction vessel equipped with a stirrer, reflux condenser, dropping tank and thermometer. Further, 0.15 parts of ammonium persulfate (2% aqueous solution) was added to the reaction vessel while maintaining the temperature of the reaction vessel at 80° C. After 5 minutes following the addition, the emulsion prepared as follows was dropped from the dropping tank to the reaction vessel over 150 minutes.

Preparation of Emulsion:

An emulsion was prepared by mixing 24 parts of methyl methacrylate (MMA), 34 parts of butyl acrylate (BA), 1.5 parts of acrylic acid (AA), 0.1 parts of n-dodecyl mercaptan (nDDM), 1.5 parts of PELEX SS-L, 0.15 parts of ammonium persulfate and 69 parts of water by using a homomixer at 6000 rpm for 5 minutes. After the completion of dropping the emulsion, the temperature of the reaction vessel was maintained at 80° C. for 60 minutes, and then lowered to the room temperature. Then, a 25% aqueous ammonia solution was added to the reaction vessel to adjust a pH to 8.0, water was further added to adjust the solid content to 40% by weight to prepare an acrylic emulsion as an adhesive coating solution. A coating solution was prepared by uniformly dispersing 7.5 parts by weight of the obtained adhesive coating solution in 92.5 parts by weight of water, and then the coating solution was coated on the surface of the polyolefin resin porous membrane by using a gravure coater. Water was removed by drying at 60° C. Furthermore, the other side was also similarly coated with the coating solution and dried to obtain a separator for electricity storage devices having the adhesive layer.

e. Battery Fabrication

A laminate type secondary battery was fabricated by using the positive electrode, negative electrode, and nonaqueous electrolytic solution obtained in the a to c, and the separator obtained in d, wherein the laminate type secondary battery has a size of 100 mm×60 mm and a capacity of 3 Ah, and was charged with a constant current and constant voltage (CCCV) for 3 hours under the conditions of a current value of 1 A (0.3 C) and a cut-off battery voltage of 4.2V.

f. Nail Puncture Evaluation

The laminate type secondary battery was placed on the iron plate in the explosion-proof booth. An iron nail having a diameter of 2.5 mm was stabbed at the center of the laminate type secondary battery at a rate of 3 mm/second at about 25° C. so as to pierce the center of the battery, and the nail was kept penetrating therethrough. The surface temperature of the laminate type battery was measured, evaluated and ranked as follows based on the maximum temperature reached.

A: 40° C. or lower
B: Higher than 40° C. and 50° C. or lower.
C: Higher than 50° C. and 80° C. or lower.
D: Higher than 80° C. and 100° C. or lower.
E: Higher than 100° C., or fired or exploded.

<Cycle Test>

According to the aforementioned procedures a to c, a positive electrode, negative electrode, and nonaqueous electrolytic solution were prepared, and the adhesive layer was formed on the polyolefin microporous membrane each obtained in Examples and Comparative Examples by the procedure d.

e. Battery Fabrication

The separator obtained in each Example and Comparative Example was cut into a circle of 24 mmφ, and the positive electrode and the negative electrode were each cut into a circle of 16 mmφ. The negative electrode, the separator, and the positive electrode were stacked in this order so that the positive electrode and the active material surface of the negative electrode were opposed to each other, and these were pressed or heat pressed, and housed in a stainless steel container with a lid. The container and the lid were insulated, and the container was in contact with the copper foil of the negative electrode and the lid was in contact with the aluminum foil of the positive electrode, respectively. A simple battery having a capacity of 3 mAh was assembled by injecting 0.2 ml of the nonaqueous electrolytic solution into the container and sealing the container.

f. Cycle Test

Cycle characteristics were evaluated on the simple battery obtained in the procedure e, having the separators obtained in Examples and Comparative Examples, respectively, according to the following procedures.

(1) Pretreatment

The above simple battery was charged with a constant current to a voltage of 4.2 V at a current value of ⅓ C, charged with a constant voltage of 4.2 V for 8 hours, and subsequently discharged to a cut-off voltage of 3.0 V at a current of ⅓ C. then, the battery was charged with a constant current to a voltage of 4.2 V at a current value of 1 C, then charged with a constant voltage of 4.2 V for 3 hours, and further discharged to a cut-off voltage of 3.0 V with a current of 1 C. Finally, the battery was charged with a constant current to 4.2 V at a current value of 1 C, and was charged with a constant voltage of 4.2 V for 3 hours. Incidentally, 1 C refers to a current value for discharging the reference capacity of a battery in one hour.

(2) Cycle Test

After the pretreatment, the battery was discharged to a discharge cut-off voltage of 3 V with a discharge current of 1 C under the condition of temperature of 25° C., it was charged to a charge cut-off voltage of 4.2 V at a charge current of 1 C, and the discharge and the charge were regarded as one cycle, and these were repeated. Thereafter, the capacity retention ratio of a capacity after 200 cycles to an initial capacity (capacity at first cycle) were evaluated as cycle characteristics were evaluated and ranked according to the following criteria.

(3) Evaluation Criteria of Cycle Characteristics

A: Capacity retention ratio (%) of 90% or more and 100% or less.
B: Capacity retention ratio (%) of 85% or more and less than 90%.
C: Capacity retention ratio (%) of 80% or more and less than 85%.
D: Capacity retention ratio (%) of less than 80%.

<Gas Generation Test>

The laminate sheet was cut into a certain constant size and formed into a pack shape (6 cm×8 cm) with an impulse sealer (hereinafter referred to as "Lamipack"). Three polyolefin microporous membranes cut into 10 cm×10 cm were folded, and inserted into Lamipack, and vacuum dried at 80° C. for 12 hours. 0.4 mL of an electrolytic solution (LI-PASTE-E2MEC/PF1; manufactured by Toyama Pharmaceutical Co., Ltd.) was added, and the opening of Lamipack was sealed with a sealer.

This was stored in an oven set at 85° C. for 3 days, the weight before and after the test was measured, and the volume was calculated by the Archimedes method. The weight was converted by the density of water (20° C.: 0.9982 g/cm$^3$). (Archimedes method: F=-ρVg)

Gas generation amount=Volume after test-Volume before test

The measurement was carried out twice for each polyolefin microporous membrane, and an average gas generation amount of 1.2 mL or more was ranked as C, the value of 0.8 mL or more and less than 1.2 mL was ranked as B, and the value of less than 0.8 mL was ranked as A.

<Defect Ratio in Adhesion Treatment>

The positive electrode and negative electrode were laminated via the polyolefin microporous membrane and was wound into a flat shape to fabricate a wound laminated body, and the wound laminated body was put in a laminated film. Then it was pressed at a pressure of 1.0 MPa and 100° C. for 3 minutes, and the frequency of defects (warping, wrinkles, and edge face displacement) was visually inspected, evaluated and ranked as follows.

A: 0/10 of defect is observed (no defective)
B: 1/10 of defect is observed
C: 2/10 of defects are observed
D: 3/10 or more of defects are observed Example 1

<Production of Polyolefin Microporous Membrane>

A polyolefin microporous membrane having a two-type and three-layer laminated structure (B layer-A layer-B layer) was produced by the following procedures. A resin composition of the surface layer (B layer) contained 80 parts by weight of polyethylene having a melting point of 135° C., viscosity-average molecular weight of 600,000 and molecular weight distribution of 6.0 and 20 parts by weight of homopolymer polypropylene having a melting point of 160° C., viscosity-average molecular weight of 400,000, and molecular weight distribution of 10.0. A resin composition of the intermediate layer (A layer) contained 100 parts by weight of polyethylene having a viscosity-average molecular weight of 600,000 and molecular weight distribution of 6.0. Then 0.3 parts by weight of tetrakis-(methylene-3-(3', 5'-di-t-butyl-4'-hydroxyphenyl)propionate)methane was mixed as an antioxidant to the resin composition of each layer. Each of the obtained mixtures was charged into a twin screw extruder having a diameter of 25 mm and L/D=48 via a feeder. Further, 200 parts by weight of liquid paraffin (kinetic viscosity of 75.90 cSt at 37.78° C.) as a pore-forming material was poured into each extruder by side feed, kneaded at 200° C. and 200 rpm, and extruded from a T-die which is positioned at the tip of the extruder and is capable of coextruding in a two-type and three-layer structure, so that the ratio of the total thickness of the surface layers and the thickness of the intermediate layer was 40:60. Immediately after the extrusion, the sheet was cooled and solidified with a cast roll cooled to 25° C. to form a sheet having a thickness of 1.3 mm. The sheet was stretched 7×7 times at 124° C. by a simultaneous biaxial stretching machine, and then immersed in methylene chloride to extract and remove liquid paraffin. Thereafter, the sheet was dried and stretched 1.5 times in the width direction (TD) at a strain rate of 9.0%/sec at 120° C. by a tenter stretching machine. Thereafter, the stretched sheet was subjected to heat treatment where the sheet was relaxed in the width direction (TD) at a strain rate of 2.0%/sec at 133° C. so as to be relaxed 0.9 times in the width after the transverse stretching, to obtain a polyolefin microporous membrane which has a two-type and three-layer laminated structure with the two layers of the surface layers (B layer) of the same composition and the intermediate layer (A layer) of the different composition.

Example 2

A polyolefin microporous membrane was obtained under the same conditions as in Example 1 except that the extrusion was carrying out so that the ratio of the total thickness of the surface layers and the thickness of the intermediate layer was 20:80 upon extrusion from the T-die.

Example 3

A polyolefin microporous membrane was obtained under the same conditions as in Example 1 except that the resin composition of the surface layer (B layer) contained 95 parts by weight of polyethylene and 5 parts by weight of polypropylene.

Example 4

A polyolefin microporous membrane was obtained under the same conditions as in Example 1 except that the resin composition of the surface layer (B layer) contained 73 parts by weight of polyethylene and 27 parts by weight of polypropylene, and a temperature upon relaxation treatment of 138° C.

Example 5

A polyolefin microporous membrane was obtained under the same conditions as in Example 1 except that the resin composition of the intermediate layer (A layer) contained 98 parts by weight of polyethylene having the melting point of 135° C., viscosity-average molecular weight of 600,000 and molecular weight distribution of 6.0, and 2 parts by weight of polypropylene having the melting point of 160° C., viscosity-average molecular weight of 400,000 and molecular weight distribution of 10.0.

Example 6

A microporous polyolefin membrane was obtained under the same conditions as in Example 1 except that the surface layer (B layer) contained polyethylene having the melting point of 135° C., viscosity-average molecular weight of 700,000, molecular weight distribution of 3.0, and homopolymer polypropylene having a melting point of 165° C., viscosity-average molecular weight of 400,000, and molecular weight distribution of 6.0, and the intermediate layer (A layer) contained polyethylene having the melting point of 135° C., viscosity-average molecular weight of 700,000 and molecular weight distribution of 3.0, and the stretching treatment was carried out with a tenter stretching machine at the strain rate of 12%/sec, and the relaxation treatment was carried out at the strain rate of 0.5%/sec and a temperature of 132° C.

Example 7

A polyolefin microporous membrane was obtained under the same conditions as in Example 1 except that the resin composition of the surface layer (B layer) contained 78 parts by weight of polyethylene having the melting point of 135° C., viscosity-average molecular weight of 600,000, and molecular weight distribution of 6.0, 19 parts by weight of polypropylene having the melting point of 160° C., viscosity-average molecular weight of 400,000, and molecular weight distribution of 10.0, and 3 parts by weight of silica "DM10C" (trademark, manufactured by Tokuyama Corporation and treated hydrophobically with dimethyldichlorosilane) having an average primary particle size of 15 nm, and the temperature upon relaxation treatment was 140° C.

Example 8

A microporous polyolefin membrane was obtained under the same conditions as in Example 1 except that the surface layer (B layer) contained polyethylene having the melting point of 135° C., viscosity-average molecular weight of 500,000, and molecular weight distribution of 6.0, and homopolymer polypropylene having a melting point of 155° C., viscosity-average molecular weight of 200,000, and molecular weight distribution of 6.0, and the intermediate layer (A layer) contained polyethylene having the melting point of 135° C., viscosity-average molecular weight of 500,000 and molecular weight distribution of 6.0, and the stretching was carried out with a tenter stretching machine at the strain rate of 4.0%/sec, and the relaxation treatment was carried out at the strain rate of 3.5%/sec and a temperature of 138° C.

Example 9

A polyolefin microporous membrane was obtained under the same conditions as in Example 1 except that the surface layer (B layer) contained 70 parts by weight of polyethylene having the melting point of 135° C., viscosity-average molecular weight of 700,000, and molecular weight distribution of 6.0, 20 parts of polyethylene having the melting point of 135° C., viscosity-average molecular weight of 250,000 and molecular weight distribution of 6.0, and 10 parts of homopolymer polypropylene having the melting point of 160° C., viscosity-average molecular weight of 400,000, and molecular weight distribution of 10.0, and the intermediate layer (A layer) contained polyethylene having the melting point of 135° C., viscosity-average molecular weight of 700,000, and molecular weight distribution of 6.0, and the extrusion was carried out so that 300 parts by weight of liquid paraffin was injected into each extruder by side feed and the ratio of the total thickness of the surface layers and the thickness of the intermediate layer was 35:65, and after the extrusion, the extruded composition was immediately cooled and solidified with a cast roll cooled at 25° C. to form a sheet having a thickness of 1.7 mm.

Example 10

A polyolefin microporous membrane was obtained under the same conditions as in Example 9 except that the intermediate layer (A layer) contained 40 parts by weight of polyethylene having the melting point of 135° C., viscosity-average molecular weight of 2,000,000, and molecular weight distribution of 7.0 and 60 parts by weight of polyethylene having the melting point of 135° C., viscosity-average molecular weight of 250,000, and molecular weight distribution of 6.0.

Example 11

A polyolefin microporous membrane was obtained under the same conditions as in Example 10 except that the surface layer (B layer) contained 70 parts by weight of polyethylene having the melting point of 135° C., viscosity-average molecular weight of 700,000, and molecular weight distribution of 6.0, 15 parts by weight of polyethylene having the melting point of 135° C., viscosity-average molecular weight 250,000, molecular weight distribution 6.0 parts, 15 parts by weight of low density polyethylene (LDPE) having a melting point of 130° C., viscosity-average molecular weight of 150,000 and molecular weight distribution of 5.0, and 5 parts by weight of homopolymer polypropylene having the melting point of 160° C., viscosity-average molecular weight of 400,000 and molecular weight distribution of 10.0.

Example 12

A polyolefin microporous membrane was obtained under the same conditions as in Example 11 except that the intermediate layer (A layer) contained 45 parts by weight of polyethylene having the melting point of 135° C., viscosity-average molecular weight of 2,000,000, and molecular weight distribution of 7.0, 45 parts by weight of polyethylene having the melting point of 135° C., viscosity-average molecular weight of 250,000, and molecular weight distribution of 6.0, and 10 parts by weight of low density polyethylene (LDPE) having a viscosity-average molecular weight of 150,000 and molecular weight distribution of 5.0.

Example 13

A polyolefin microporous membrane was obtained under the same conditions as in Example 12 except that the surface layer (B layer) contained 75 parts by weight of polyethylene having the melting point of 135° C., viscosity-average molecular weight of 700,000, and molecular weight distribution of 6.0, 20 parts by weight of polyethylene having the melting point of 135° C., viscosity-average molecular weight of 250,000, and molecular weight distribution of 6.0, and 5 parts by weight of homopolymer polypropylene having the melting point of 160° C., viscosity-average molecular weight of 400,000, and molecular weight distribution of 10.0.

Example 14

A polyolefin microporous membrane with a two-type and two-layer laminated structure (layer A-layer B) was obtained by fabricating a polyolefin microporous membrane under the same conditions as in Example 10 except for using a laminated die that is capable of coextruding a two-type and two-layer structure.

Example 15

A polyolefin microporous membrane having a three-type and five-layer structure (B layer-C layer-A layer-C layer-B layer) was produced by the following procedures. The resin composition of layer A consisted of 40 parts by weight of polyethylene having the melting point of 135° C., viscosity-average molecular weight of 2,000,000, and molecular weight distribution of 7.0, and 60 parts by weight of polyethylene having the melting point of 135° C., viscosity-average molecular weight of 250,000, and molecular weight distribution of 6.0. As an antioxidant, 0.3 part by weight of tetrakis-(methylene-3-(3',5'-di-t-butyl-4'-hydroxyphenyl) propionate)methane was mixed. The obtained mixture was fed into a twin screw extruder having a diameter of 25 mm and L/D=48 via a feeder. Furthermore, 300 parts by weight of liquid paraffin (kinetic viscosity at 37.78° C. of 75.90 cSt) as a pore forming-material was injected into each extruder by side feed, kneaded at 200° C. and 200 rpm, and extruded from the T-die disposed at the tip of the extruder. Immediately after the extrusion, it was cooled and solidified with a cast roll cooled to 25° C. to form a single-layer sheet having a thickness of 0.4 mm. A 0.4 mm single-layer sheet was molded under the same conditions as those for the A layer by using the resin composition of B layer having 70 parts by weight of polyethylene having the melting point of 135° C., viscosity-average molecular weight of 700,000, and molecular weight distribution of 6.0, 20 parts by weight of polyethylene having the melting point of 135° C., viscosity-average molecular weight of 250,000, and molecular weight distribution of 6.0, and 10 parts by weight of homopolymer polypropylene having the melting point of 160° C., viscosity-average molecular weight of 400,000, and molecular weight distribution of 10.0. A 0.4 mm single-layer sheet was molded under the same conditions as those for the A layer, by using a resin composition of layer C having 90 parts by weight of polyethylene having the melting point of 135° C., viscosity-average molecular weight of 500,000, and molecular weight distribution of 6.0 and 10 parts by weight of homopolymer polypropylene having the melting point of 160° C., viscosity-average molecular weight of 400,000, and molecular weight distribution of 10.0. A polyolefin microporous membrane having a three-type and five-layer laminated structure was obtained by stacking the obtained three types of single-layer sheets so as to form a three-layer and five-layer laminated structure of B layer-C layer-A layer-C layer-B layer, under the same conditions following the simultaneous biaxial stretching as in Example 1.

Example 16

A polyolefin microporous membrane was obtained under the same conditions as in Example 10 except that the intermediate layer (A layer) contained 40 parts by weight of polyethylene having the melting point of 135° C., viscosity-average molecular weight of 2,000,000, and molecular weight distribution of 7.0, 30 parts by weight of polyethylene having the melting point of 135° C., viscosity-average molecular weight of 700,000, and molecular weight distribution of 6.0, and 30 parts by weight of polyethylene having the melting point of 135° C., viscosity-average molecular weight of 250,000, and molecular weight distribution of 6.0.

Example 17

A polyolefin microporous membrane was obtained under the same conditions as in Example 16 except that the surface layer (B layer) contained 40 parts by weight of polyethylene having the melting point of 135° C., viscosity-average molecular weight of 700,000, and molecular weight distribution 6.0, 20 parts by weight of polyethylene having the melting point of 135° C., viscosity-average molecular weight of 250,000, and molecular weight distribution 6.0, 30 parts by weight of low density polyethylene (LDPE) having the melting point of 130° C., viscosity-average molecular weight of 150,000, and molecular weight distribution 5.0, and 10 parts by weight of homopolymer polypropylene having the melting point of 160° C., viscosity-average molecular weight of 400,000, and molecular weight distribution 10.0.

Example 18

A polyolefin microporous membrane was obtained under the same conditions as in Example 16 except that the surface layer (B layer) contained 8 parts by weight of polyethylene having the melting point of 135° C., viscosity-average molecular weight of 2,000,000, and molecular weight distribution 7.0, 72 parts by weight of polyethylene having the melting point of 135° C., viscosity-average molecular weight of 700,000, and molecular weight distribution 6.0, 15 parts by weight of polyethylene having the melting point of 135° C., viscosity-average molecular weight of 250,000, and molecular weight distribution 6.0, and 5 parts by weight of homopolymer polypropylene having the melting point of 160° C., viscosity-average molecular weight of 400,000, and molecular weight distribution 10.0.

Example 19

A polyolefin microporous membrane was obtained under the same conditions as in Example 9 except that the polypropylene contained in the surface layer (B layer) was homopolymer polypropylene having the melting point of 160° C., viscosity-average molecular weight of 1,000,000, and molecular weight distribution of 10.0.

Comparative Example 1

A single layer (only A layer) polyolefin microporous membrane was produced by the following procedures. The resin composition consisted of 90 parts by weight of polyethylene having a melting point of 135° C., viscosity-average molecular weight of 500,000 and molecular weight distribution of 6.0 and 10 parts by weight of homopolymer polypropylene having a melting point of 160° C., viscosity-average molecular weight of 400,000 and molecular weight distribution of 10.0. As an antioxidant, 0.3 part by weight of tetrakis-(methylene-3-(3',5'-di-t-butyl-4'-hydroxyphenyl) propionate)methane was mixed thereto. The obtained mixture was fed into a twin screw extruder having a diameter of 25 mm and L/D=48 via a feeder. Further, 200 parts by weight of liquid paraffin (kinetic viscosity at 37.78° C. of 75.90 cSt) as a pore-forming material was poured into each extruder by side feed, kneaded at 200° C. and 200 rpm, and extruded from a T-die disposed at the tip of the extruder. Immediately after the extrusion, the sheet was cooled and solidified with a cast roll cooled to 25° C. to form a sheet having a thickness of 1.3 mm. The sheet was stretched 7×7 times at 118° C. with a simultaneous biaxial stretching machine, and then immersed in methylene chloride to extract and remove liquid paraffin. Thereafter, the sheet was dried and stretched 1.5 times in the width direction (TD) at a strain rate of 17.0%/sec at 120° C. by a tenter stretching machine. Thereafter, the stretched sheet was subjected to heat treatment where the sheet was relaxed in the width direction (TD) at the strain rate of 0.3%/sec at 133° C. so as to be relaxed 0.9 times in the width after the transverse stretching to obtain a single layer polyolefin microporous membrane.

Comparative Example 2

A polyolefin microporous membrane was obtained under the same conditions as in Comparative Example 1 except that the biaxial stretching was carried out at 124° C., and the stretching using a tenter stretching machine was carried out at the strain rate of 7.0%/sec, and the relaxation treatment was carried out at the strain rate of 0.9%/sec.

Comparative Example 3

A polyolefin microporous membrane was obtained under the same conditions as in Example 1 except that the resin composition of the surface layer (B layer) contained 60 parts by weight of polyethylene and 40 parts by weight of polypropylene, and the temperature upon relaxation treatment was 137° C.

Comparative Example 4

A polyolefin microporous membrane was obtained under the same conditions as in Example 1 except that the resin composition of the surface layer (B layer) contained 20 parts by weight of polyethylene and 80 parts by weight of polypropylene, and the temperature upon relaxation treatment of 140° C.

Comparative Example 5

A polyolefin microporous membrane was obtained under the same conditions as in Example 1 except that the resin composition of the surface layer (B layer) contained 24 parts by weight of polyethylene having the melting point of 135° C., viscosity-average molecular weight of 600,000 and molecular weight distribution of 6.0, 6 parts by weight of polypropylene having the melting point of 160° C., viscosity-average molecular weight of 400,000 and molecular weight distribution of 10.0, and 70 parts by weight of silica "DM10C" (trademark, manufactured by Tokuyama Corporation and treated hydrophobically with dimethyldichlorosilane) having an average primary particle size of 15 nm, and the extrusion of the resin composition was carried out so that the ratio of the total thickness of the surface layers and the intermediate layer thickness was 25:75 upon extrusion from the T-die, and the temperature upon relaxation treatment was 145° C.

Comparative Example 6

A polyolefin microporous membrane was obtained under the same conditions as in Example 1 except that polyethylene having the melting point of 135° C., viscosity-average molecular weight of 900,000, and molecular weight distribution of 6.0 was used as the polyethylene contained in the surface layer and the intermediate layer.

Comparative Example 7

A polyolefin microporous membrane was obtained under the same conditions as in Example 1 except for replacing the resin composition of the surface layer in Example 1 with the resin composition of the intermediate layer.

Comparative Example 8

A polyolefin microporous membrane was obtained under the same conditions as in Example 1 except that polyethylene having the melting point of 135° C., viscosity-average molecular weight of 250,000, and molecular weight distribution of 6.0 was used as the polyethylene contained in the surface layer and the intermediate layer, the amount of liquid paraffin to be injected into the extruder was 150 parts by weight with respect to 100 parts of the resin, the extrusion was carried out so that the ratio of the total thickness of the surface layers and the thickness of the intermediate layer was 36:64 when extruded from the T-die, and the temperature upon relaxation treatment was 120° C.

Comparative Example 9

38.8 parts by weight of polyethylene having the melting point of 135° C., viscosity-average molecular weight of 250,000 and molecular weight distribution of 6.0, 1.2 parts by weight of polypropylene having the melting point of 160° C., viscosity-average molecular weight of 400,000, and molecular weight distribution of 10.0, and 60 parts by weight of liquid paraffin, were melt-kneaded by an extruder equipped with a T-die at the tip thereof, and then extruded to prepare a sheet having a thickness of 1300 μm. The sheet was stretched simultaneously in the longitudinal and transverse directions to produce a sheet having a thickness of 20 μm. This sheet was immersed in methyl ethyl ketone (MEK) to extract and remove liquid paraffin, and then dried to produce a microporous membrane B having a thickness of 18 μm. Moreover, 45.0 parts by weight of polyethylene having a melting point of 135° C., viscosity-average molecular weight of 250,000 and molecular weight distribution of 6.0 and 55.0 parts by weight of liquid paraffin were melt-kneaded by an extruder equipped with a T-die at the tip thereof and then extruded to prepare a sheet having a thickness of 1300 μm. The sheet was stretched to 8 times in MD and 8 times in TD to produce a sheet having a thickness of 20 μm. This sheet was immersed in methyl ethyl ketone (MEK) to extract and remove liquid paraffin, and then dried to produce a microporous membrane A having a thickness of 18 μm. Three layers were laminated in the form of microporous membrane B/microporous membrane A/microporous membrane B, stretched three times in the longitudinal direction while passing through several rolls heated to 110° C., and then heated to 122° C. by passing through several rolls, to produce a longitudinally stretched membrane having three laminated sheets. Subsequently, the longitudinally stretched membrane was stretched twice at the strain rate of 4%/sec in the transverse direction with a tenter heated to 118° C., and then forcibly relaxed 0.9 times in the width after the stretching at the strain rate of 0.7%/sec while heat-treated in a region of the tenter heated to 128° C., to fabricate a three-layer microporous membrane of B/A/B type having a thickness of 10 μm.

Comparative Example 10

A polyolefin microporous membrane was obtained under the same conditions as in Comparative Example 9 except that the resin composition of the microporous membrane A contained 22.5 parts by weight of polyethylene having the melting point of 135° C., viscosity-average molecular weight of 250,000 and molecular weight distribution of 6.0, 22.5 parts by weight of low density polyethylene (LDPE) having a viscosity-average molecular weight of 150,000 and molecular weight distribution of 5.0, and 55 parts by weight of liquid paraffin, and the resin composition of microporous membrane B contained 24 parts by weight of polyethylene having the melting point of 135° C., viscosity-average molecular weight of 2,000,000, and molecular weight distribution of 7.0, and 16 parts by weight of homopolymer polypropylene having the melting point 160° C., viscosity-average molecular weight of 400,000, and molecular weight distribution of 10.0, and 60 parts by weight of liquid paraffin, the simultaneous biaxial stretching ratio before liquid paraffin extraction was 8 times in MD and 8 times in TD, the strain rate upon transverse stretching was 16.0%/sec after liquid paraffin extraction, and the relaxation after transverse stretching was carried out at 125° C. and the strain rate of 2.8%/sec.

Comparative Example 11

A polyolefin microporous membrane was obtained under the same conditions as in Comparative Example 9 except that the surface layer (B layer) contained 10 parts by weight of polyethylene having has the melting point of 135° C., viscosity-average molecular weight of 2,000,000, and molecular weight distribution of 7.0, 87 parts by weight of polyethylene having the melting point of 135° C., viscosity-average molecular weight of 250,000, and molecular weight distribution of 6.0, and 3 parts by weight of random polymer polypropylene having the melting point of 155° C., viscosity-average molecular weight of 100,000 and molecular weight distribution of 3.0, and the intermediate layer (A layer) contained 18 parts by weight of polyethylene having the melting point of 135° C., viscosity-average molecular weight of 2,000,000 and molecular weight distribution of 7.0 and 82 parts by weight of polyethylene having the melting point of 135° C., viscosity-average molecular weight of 250,000 and molecular weight distribution 6.0, the simultaneous biaxial stretching ratio at 118° C. was 5 times in MD and 5 times in TD, the TD stretching in a tenter stretching machine was carried out at a temperature of 126° C., strain rate 4.0%/sec and stretching ratio of 1.3 times, and the relaxation treatment was carried out at 126° C. at the strain rate of 3.0%/sec and relaxation ratio of 0.92 times the width after the TD stretching.

Comparative Example 12

A polyolefin microporous membrane was obtained under the same conditions as in Comparative Example 11 except that the surface layer (B layer) contained 97 parts by weight of polyethylene having has the melting point of 135° C., viscosity-average molecular weight of 250,000, and molecular weight distribution of 6.0 and 3 parts by weight of homopolymer polypropylene having a melting point of 162° C., viscosity-average molecular weight of 400,000 and molecular weight distribution of 10.0, and the intermediate layer (A layer) contained 20 parts by weight of polyethylene having the melting point of 135° C., viscosity-average molecular weight of 2,000,000 and molecular weight distribution of 7.0 and 80 parts by weight of polyethylene having the melting point of 135° C., viscosity-average molecular weight of 250,000 and molecular weight distribution 6.0, the simultaneous biaxial stretching temperature was 117° C., the TD stretching ratio in the tenter stretching machine was 1.4 times, and the relaxation treatment was not carried out.

Comparative Example 13

A polyolefin microporous membrane was obtained under the same conditions as in Comparative Example 12 except that the surface layer (B layer) contained 92 parts by weight of polyethylene having has the melting point of 135° C., viscosity-average molecular weight of 250,000, and molecular weight distribution of 6.0 and 8 parts by weight of random polymer polypropylene having the melting point of 155° C., viscosity-average molecular weight of 100,000 and molecular weight distribution of 3.0, and the intermediate layer (A layer) contained 30 parts by weight of polyethylene having the melting point of 135° C., viscosity-average molecular weight of 2,000,000 and molecular weight distribution of 7.0 and 70 parts by weight of polyethylene having the melting point of 135° C., viscosity-average molecular weight of 250,000 and molecular weight distribution 6.0, the simultaneous biaxial stretching temperature was 115° C., and the relaxation treatment was carried out at 124° C. and the relaxation ratio of 0.86 times the width after the TD stretching.

Comparative Example 14

A polyolefin microporous membrane was obtained under the same conditions as in Comparative Example 13 except that the surface layer (B layer) contained 80 parts by weight of polyethylene having has the melting point of 135° C., viscosity-average molecular weight of 700,000, and molecular weight distribution of 6.0 and 20 parts by weight of homopolymer polypropylene having the melting point of 160° C., viscosity-average molecular weight of 1,600,000 and molecular weight distribution of 10.0, and the intermediate layer (A layer) contained 40 parts by weight of polyethylene having the melting point of 135° C., viscosity-average molecular weight of 2,000,000 and molecular weight distribution of 7.0 and 60 parts by weight of polyethylene having the melting point of 135° C., viscosity-average molecular weight of 700,000 and molecular weight distribution 6.0, setting a TD stretching temperature to 124° C. and the strain rate to 20%/sec, and not carrying out relaxation treatment.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Thickness (μm) | | 10 | 10 | 10 | 10 | 10 | 10 | 10 | 8 | 9 | 10 |
| Porosity (%) | | 50 | 49 | 46 | 48 | 49 | 48 | 52 | 40 | 46 | 49 |
| Air permeability(sec) | | 80 | 80 | 90 | 90 | 100 | 110 | 90 | 100 | 80 | 85 |
| Puncture strength (gf) | | 250 | 250 | 210 | 270 | 240 | 300 | 210 | 170 | 270 | 290 |
| Laminated structure | | B/A/B | B/A/B | B/A/B | B/A/B | B/A/B | B/A/B | B/A/B | B/A/B | B/A/B | B/A/B |
| Surface layer (B layer) | Thickness proportion (%) | 40 | 20 | 40 | 40 | 40 | 40 | 40 | 40 | 35 | 35 |
| | PP content (wt %) | 20 | 20 | 5 | 27 | 20 | 20 | 20 | 20 | 10 | 10 |
| | Inorganic content (wt %) | 0 | 0 | 0 | 0 | 0 | 0 | 3 | 0 | 0 | 0 |
| Intermediate layer (A layer) | Thickness proportion (%) | 60 | 80 | 60 | 60 | 60 | 60 | 60 | 60 | 65 | 65 |
| | PP content (wt %) | 0 | 0 | 0 | 0 | 2 | 0 | 0 | 0 | 0 | 0 |
| | Inorganic content (wt %) | 0 | 0 | 0 | 0 | 0 | 0 | 0 | 0 | 0 | 0 |
| GPC | Proportion of 3,000,000 or more(%) | 8 | 8 | 9 | 8 | 8 | 4 | 8 | 8 | 8 | 13 |
| | Proportion of 30,000 or less(%) | 2 | 2 | 1.5 | 2.5 | 2 | 1 | 2 | 2.5 | 2.5 | 2.3 |
| TD thermal shrinkage (%) under MD constant load | | 30 | 32 | 23 | 34 | 30 | 38 | 23 | 16 | 22 | 24 |
| Melt index (g/10 min.) | Entire | 0.30 | 0.28 | 0.26 | 0.38 | 0.32 | 0.18 | 0.35 | 0.70 | 0.27 | 0.24 |
| | A layer | 0.25 | 0.25 | 0.25 | 0.25 | 0.30 | 0.15 | 0.25 | 0.60 | 0.22 | 0.20 |
| | B layer | 0.70 | 0.70 | 0.35 | 1.10 | 0.70 | 0.50 | 0.90 | 1.80 | 0.45 | 0.45 |
| | MI ratio B/A | 2.80 | 2.80 | 1.40 | 4.40 | 2.33 | 3.33 | 3.60 | 3.00 | 2.05 | 2.25 |

TABLE 1-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Shutdown response time (sec) |  | 18 | 17 | 15 | 20 | 23 | 21 | 19 | 13 | 16 | 15 |
| Shutdown temperature (° C.) |  | 141 | 140 | 140 | 142 | 145 | 144 | 140 | 133 | 140 | 139 |
| Meltdown temperature (° C.) |  | 181 | 176 | 165 | 195 | 180 | 180 | 180 | 155 | 185 | 185 |
| Tensile test in TD | Tensile strength at break (kgf/cm²) | 1000 | 950 | 900 | 1100 | 1050 | 1200 | 1700 | 700 | 1200 | 1300 |
|  | Tensile elongation at break (%) | 65 | 75 | 110 | 45 | 60 | 80 | 50 | 45 | 85 | 95 |
| Nail puncture test |  | B | B | C | C | C | C | C | C | B | A |
| Gas generation |  | A | A | A | A | A | A | B | A | A | A |
| Cycle test |  | B | B | C | B | B | B | A | C | B | B |
| Defect ratio in adhesion process |  | A | A | B | B | A | C | C | C | A | A |

15

TABLE 2

|  |  | Example 11 | Example 12 | Example 13 | Example 14 | Example 15 | Example 16 | Example 17 | Example 18 | Example 19 |
|---|---|---|---|---|---|---|---|---|---|---|
| Thickness (μm) |  | 10 | 10 | 11 | 10 | 16 | 10 | 10 | 10 | 10 |
| Porosity (%) |  | 48 | 48 | 50 | 49 | 49 | 47 | 47 | 48 | 47 |
| Air permeability(sec) |  | 80 | 80 | 85 | 80 | 145 | 95 | 95 | 90 | 85 |
| Puncture strength (gf) |  | 250 | 240 | 250 | 260 | 460 | 280 | 280 | 310 | 280 |
| Laminated structure |  | B/A/B | B/A/B | B/A/B | A/B | B/C/A/C/B | B/A/B | B/A/B | B/A/B | B/A/B |
| Surface layer (B layer) | Thickness proportion (%) | 35 | 35 | 35 | 35 | 35 | 35 | 35 | 35 | 35 |
|  | PP content (wt %) | 5 | 5 | 5 | 10 | 10 | 10 | 10 | 5 | 10 |
|  | Inorganic content (wt %) | 0 | 0 | 0 | 0 | 0 | 0 | 0 | 0 | 0 |
| Intermediate layer (A layer) | Thickness proportion (%) | 65 | 65 | 65 | 65 | 65 | 65 | 65 | 65 | 65 |
|  | PP content (wt %) | 0 | 0 | 0 | 0 | 0 | 0 | 0 | 0 | 0 |
|  | Inorganic content (wt %) | 0 | 0 | 0 | 0 | 0 | 0 | 0 | 0 | 0 |
| GPC | Proportion of 3,000,000 or more (%) | 13 | 13 | 13 | 13 | 8 | 13 | 13 | 14 | 8 |
|  | Proportion of 30,000 or less (%) | 2.3 | 2.3 | 1.5 | 2.3 | 2.7 | 2.3 | 3.4 | 1.3 | 2.4 |
| TD thermal shrinkage (%) under MD constant load |  | 27 | 29 | 26 | 35 | 30 | 36 | 38 | 34 | 34 |
| Melt index (g/10 min.) | Entire | 0.25 | 0.23 | 0.20 | 0.25 | 0.43 | 0.15 | 0.51 | 0.20 | 0.24 |
|  | A layer | 0.20 | 0.17 | 0.17 | 0.20 | 0.20 | 0.09 | 0.09 | 0.17 | 0.22 |
|  | B layer | 0.45 | 0.45 | 0.35 | 0.45 | 0.45 | 0.45 | 1.40 | 0.28 | 0.39 |
|  | MI ratio B/A | 2.25 | 2.65 | 2.06 | 2.25 | 2.25 | 5.00 | 15.56 | 1.65 | 1.77 |
| Shutdown response time (sec) |  | 13 | 12 | 13 | 15 | 14 | 18 | 16 | 16 | 18 |
| Shutdown temperature (° C.) |  | 137 | 137 | 139 | 141 | 143 | 143 | 140 | 141 | 142 |
| Meltdown temperature (° C.) |  | 175 | 175 | 185 | 172 | 175 | 185 | 180 | 190 | 195 |
| Tensile test in TD | Tensile strength at break (kgf/cm²) | 1050 | 1000 | 1100 | 1250 | 1150 | 1400 | 1300 | 1200 | 1250 |
|  | Tensile elongation at break (%) | 90 | 85 | 90 | 90 | 65 | 95 | 85 | 85 | 80 |
| Nail puncture test |  | B | B | B | C | C | B | C | C | B |
| Gas generation |  | A | A | A | A | A | A | A | A | A |
| Cycle test |  | C | C | B | C | C | B | C | B | B |
| Defect ratio in adhesion process |  | A | B | A | C | B | B | C | B | B |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Thickness (μm) |  | 8 | 9 | 10 | 10 | 10 | 9 | 10 | 10 | 10 |
| Porosity (%) |  | 42 | 47 | 48 | 47 | 48 | 46 | 47 | 52 | 50 |
| Air permeability(sec) |  | 130 | 70 | 120 | 170 | 120 | 100 | 90 | 110 | 60 |
| Puncture strength (gf) |  | 420 | 150 | 290 | 310 | 100 | 320 | 220 | 400 | 150 |
| Laminated structure |  | Single layer(A) | Single layer(A) | B/A/B | B/A/B | B/A/B | B/A/B | B/A/B | B/A/B | B/A/B |
| Surface layer (B layer) | Thickness proportion (%) | 0 | 0 | 40 | 40 | 25 | 40 | 40 | 36 | 67 |

TABLE 3-continued

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
|  | PP content (wt %) | — | — | 40 | 80 | 20 | 20 | 0 | 20 | 3 |
|  | Inorganic content (wt %) | — | — | 0 | 0 | 70 | 0 | 0 | 0 | 0 |
| Intermediate layer (A layer) | Thickness proportion (%) | 100 | 100 | 60 | 60 | 75 | 60 | 60 | 64 | 33 |
|  | PP content (wt %) | 10 | 10 | 0 | 0 | 0 | 0 | 20 | 0 | 0 |
|  | Inorganic content (wt %) | 0 | 0 | 0 | 0 | 0 | 0 | 0 | 0 | 0 |
| GPC | Proportion of 3,000,000 or more (%) | 7 | 7 | 8 | 8 | 8 | 13 | 8 | 4 | 8 |
|  | Proportion of 30,000 or less(%) | 3 | 3 | 2.5 | 3.0 | 2 | 1 | 2 | 5 | 2.0 |
| TD thermal shrinkage (%) under MD constant load |  | 42 | 14 | 34 | 36 | 8 | 41 | 26 | 41 | 9 |
| Melt index (g/10 min.) | Entire | 0.57 | 0.55 | 0.75 | 1.00 | 0.50 | 0.13 | 0.40 | 1.10 | 1.30 |
|  | A layer | — | — | 0.25 | 0.25 | 0.45 | 0.11 | 0.70 | 1.00 | 1.00 |
|  | B layer | — | — | 5.80 | 32.00 | 0.70 | 0.15 | 0.25 | 1.80 | 1.50 |
|  | MI ratio B/A | — | — | 23.20 | 128.00 | 1.56 | 1.36 | 0.36 | 1.80 | 1.50 |
| Shutdown response time (sec) |  | 15 | 16 | 23 | Unable to shutdown | Unable to shutdown | Unable to shutdown | 16 | 11 | 14 |
| Shutdown temperature (° C.) |  | 143 | 139 | 143 | Unable to shutdown | Unable to shutdown | Unable to shutdown | 138 | 140 | 137 |
| Meltdown temperature (° C.) |  | 175 | 183 | >200 | >200 | 180 | 190 | 185 | 160 | 160 |
| Tensile test in TD | Tensile strength at break (kgf/cm$^2$) | 2200 | 600 | 1200 | 1100 | 500 | 1300 | 900 | 1300 | 450 |
|  | Tensile elongation at break (%) | 70 | 90 | 40 | 30 | 30 | 90 | 50 | 60 | 70 |
| Nail puncture test |  | C | E | E | D | D | D | D | E | E |
| Gas generation |  | A | A | A | A | B | A | A | A | A |
| Cycle test |  | C | B | C | D | A | B | D | C | C |
| Defect ratio in adhesion process |  | D | D | C | C | D | D | A | D | B |

TABLE 4

|  |  | Comparative Example 10 | Comparative Example 11 | Comparative Example 12 | Comparative Example 13 | Comparative Example 14 |
|---|---|---|---|---|---|---|
| Thickness (μm) |  | 10 | 20 | 12 | 13 | 13 |
| Porosity (%) |  | 48 | 43 | 50 | 54 | 46 |
| Air permeability (sec) |  | 65 | 240 | 120 | 85 | 130 |
| Puncture strength (gf) |  | 300 | 500 | 270 | 230 | 340 |
| Laminated structure |  | B/A/B | B/A/B | B/A/B | B/A/B | B/A/B |
| Surface layer (B layer) | Thickness proportion (%) | 67 | 30 | 15 | 15 | 20 |
|  | PP content (wt %) | 40 | 3 | 3 | 8 | 20 |
|  | Inorganic content (wt %) | 0 | 0 | 0 | 0 | 0 |
| Intermediate layer (A layer) | Thickness proportion (%) | 33 | 70 | 85 | 85 | 80 |
|  | PP content (wt %) | 0 | 0 | 0 | 0 | 0 |
|  | Inorganic content (wt %) | 0 | 0 | 0 | 0 | 0 |
| GPC | Proportion of 3,000,000 or more (%) | 15 | 10 | 9 |  | 11 |
|  | Proportion of 30,000 or less(%) | 5 | 4 | 4.2 |  | 2 |
| TD thermal shrinkage (%) under MD constant load |  | 46 | 42 | 48 | 44 | 51 |
| Melt index (g/10 min) | Entire | 7.20 | 0.75 | 0.80 | 0.77 | 0.77 |
|  | A layer | 3.40 | 0.62 | 0.60 | 0.42 | 0.03 |
|  | B layer | 15.00 | 0.90 | 1.30 | 1.80 | 0.65 |
|  | MI ratio B/A | 4.41 | 1.45 | 2.17 | 4.29 | 21.67 |
| Shutdown response time (sec) |  | 23 | 19 | 17 | 17 | 25 |
| Shutdown temperature (° C.) |  | 130 | 140 | 139 | 140 | Unable to shutdown |
| Meltdown temperature (° C.) |  | 170 | 165 | 165 | 170 | 195 |
| Tensile test in TD | Tensile strength at break (kgf/cm$^2$) | 1600 | 1300 | 1000 | 900 | 1400 |
|  | Tensile elongation at break(%) | 75 | 120 | 90 | 80 | 90 |
| Nail puncture test |  | E | E | D | E | E |
| Gas generation |  | A | A | A | A | A |
| Cycle test |  | C | C | D | D | B |
| Defect ratio in adhesion process |  | C | D | D | D | D |

INDUSTRIAL APPLICABILITY

The polyolefin microporous membrane of the present embodiment can be suitably used as a separator for lithium ion secondary batteries, particularly as a separator for laminate type lithium ion secondary batteries. The separator comprising the polyolefin microporous membrane according to the present embodiment hardly shrinks upon hot pressing and can prohibit a reduction in permeability due to clogged micropores.

REFERENCE SIGNS LIST

1 Microporous membrane (sample)
2A, 2B Nickel foil
3A, 3B Glass plate
4 Electrical Resistance measurement apparatus
5 Thermocouple
6 Thermometer
7 Data collector
8 Oven
9 Heat resistant tape
10 Clip
11 Load

The invention claimed is:

1. A polyolefin microporous membrane having a laminated structure comprising at least one layer of an A layer containing polyolefin and at least one layer of a B layer containing polyolefin,
wherein the A layer contains 0% by weight or more and less than 3% by weight of polypropylene based on the total weight of resin components constituting the A layer, the B layer contains 1% by weight or more and less than 30% by weight of polypropylene and 60% by weight or more and 99% by weight or less of polyethylene based on a total weight of resin components constituting the B layer, and when a proportion of the polypropylene contained in the A layer is represented by PPA (% by weight) and a proportion of the polypropylene in the B layer is represented by PPB (% by weight), PPB is greater than PPA, and
wherein the polyolefin microporous membrane has a thermal shrinkage in TD at 120° C. of 10% or more and 40% or less, measured under a constant load applied in MD which is determined based on the following equation:
Load (gf)=0.01×Puncture strength (gf) of the polyolefin microporous membrane×Length (mm) in TD of the polyolefin microporous membrane.

2. The polyolefin microporous membrane according to claim 1, having a laminated structure comprising at least one layer of the A layer containing polyolefin and at least one layer of the B layer containing polyolefin on both surfaces of the A layer,
wherein a proportion of a thickness of the A layer to a total thickness of the polyolefin microporous membrane is 40% or more and 90% or less.

3. The polyolefin microporous membrane according to claim 1, wherein the B layer contains less than 5% by weight of inorganic particles.

4. The microporous membrane according to claim 1, wherein the polyolefin microporous membrane contains 10% by weight or less of molecules having a molecular weight of 3,000,000 or more, and 3.0% by weight or less of molecules having a molecular weight of 30,000 or less, in an integration curve obtained from gel permeation chromatography measurement of the polyolefin microporous membrane.

5. The polyolefin microporous membrane according to claim 1, wherein the polyolefin microporous membrane has a melt index under a load of 21.6 kgf at 190° C. is 0.1 g/10 minutes or more and 3.0 g/10 minutes or less.

6. The polyolefin microporous membrane according to claim 1, wherein the A layer of the polyolefin microporous membrane has a melt index under a load of 21.6 kgf at 190° C. is 0.01 g/10 minutes or more and 0.3 g/10 minutes or less.

7. The polyolefin microporous membrane according to claim 1, wherein the B layer of the polyolefin microporous membrane has a melt index under a load of 21.6 kgf at 190° C. is greater than 0.3 g/10 minutes and 2.0 g/10 minutes or less.

8. The polyolefin microporous membrane according to claim 1, wherein a ratio of a melt index of the B layer to a melt index of the A layer (melt index of B layer/melt index of A layer) is 1.5 or more and 20 or less.

9. The polyolefin microporous membrane according to claim 1, wherein a shutdown response time is 12 seconds or longer and 22 seconds or shorter.

10. The polyolefin microporous membrane according to claim 1, wherein a shutdown temperature is 150° C. or lower and a membrane rupture temperature is higher than 170° C.

11. The polyolefin microporous membrane according to claim 1, wherein the polypropylene contained in the polyolefin microporous membrane has a viscosity-average molecular weight of 300,000 or more and 1,200,000 or less.

12. The polyolefin microporous membrane according to claim 1, wherein the polypropylene contained in the polyolefin microporous membrane is a homopolymer.

13. The polyolefin microporous membrane according to claim 1, wherein a puncture strength is 170 gf/10 μm or more.

14. A laminate type lithium ion secondary battery, having at least one structure in which a positive electrode and a negative electrode are laminated via the polyolefin microporous membrane according to claim 1 in an external body consisting of a laminated film.

15. A polyolefin microporous membrane having a laminated structure comprising at least one layer of an A layer containing polyolefin and at least one layer of a B layer containing polyolefin,
wherein the A layer contains 0% by weight or more and less than 3% by weight of polypropylene, the B layer contains 1% by weight or more and less than 30% by weight of polypropylene, and when a proportion of the polypropylene contained in the A layer is represented by PPA (% by weight) and a proportion of the polypropylene in the B layer is represented by PPB (% by weight), PPB is greater than PPA, and
wherein the polyolefin microporous membrane has a thermal shrinkage in TD at 120° C. of 10% or more and 40% or less, measured under a constant load applied in MD which is determined based on the following equation:
Load (gf)=0.01×Puncture strength (gf) of the polyolefin microporous membrane×Length (mm) in TD of the polyolefin microporous membrane, and wherein the polyolefin microporous membrane contains 10% by weight or less of molecules having a molecular weight of 3,000,000 or more, and 3.0% by weight or less of molecules having a molecular weight of 30,000 or less, in an integration curve obtained from gel permeation chromatography measurement of the polyolefin microporous membrane.

* * * * *